(12) United States Patent
Nishimura

(10) Patent No.: US 11,062,247 B2
(45) Date of Patent: *Jul. 13, 2021

(54) ANALYSIS OF DISSIMILARITY AMONG BUSINESS COMPONENTS

(71) Applicant: International Business Machines Corporation, Armonk, NY (US)

(72) Inventor: Hiroyuki Nishimura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,487

(22) Filed: Oct. 1, 2019

(65) Prior Publication Data

US 2020/0034760 A1 Jan. 30, 2020

Related U.S. Application Data

(63) Continuation of application No. 15/622,612, filed on Jun. 14, 2017, now Pat. No. 10,600,016, which is a (Continued)

(30) Foreign Application Priority Data

Aug. 8, 2012 (JP) .................................. 2012175869

(51) Int. Cl.
G06Q 10/06 (2012.01)
(52) U.S. Cl.
CPC ......... *G06Q 10/0633* (2013.01); *G06Q 10/06* (2013.01)
(58) Field of Classification Search
CPC ........ G06Q 10/00; G06Q 40/00; G06Q 40/06; G06Q 10/0633; G06Q 10/06

(Continued)

(56) References Cited

U.S. PATENT DOCUMENTS 6,601,233 B1 7/2003 Underwood
8,032,403 B2 10/2011 Gremont et al.
(Continued)

FOREIGN PATENT DOCUMENTS

JP 2000311190 11/2000
JP 2002032549 1/2002
(Continued)

OTHER PUBLICATIONS

Baowen "Business Component Design Method Based on the Feature Matrix", Dec. 2009, Second International Workshop on Computer Science and Engineering, pp. 460-463. (Year: 2009).*

(Continued)

*Primary Examiner* — Romain Jeanty
(74) *Attorney, Agent, or Firm* — Schmeiser, Olsen & Watts, LLP; Nicholas L. Cadmus

(57) ABSTRACT

A method and system for utilizing dissimilarity among business components of a business. For each business process of N business processes of a business, N two-dimensional symmetric dissimilarity matrices are stored, wherein N is at least 1. A single dissimilarity matrix is generated, wherein if N=1, the single dissimilarity matrix is a copy of a two-dimensional symmetric dissimilarity matrix of the N two-dimensional symmetric dissimilarity matrices, and wherein if N is at least 2, the elements of the single dissimilarity matrix are a mean of corresponding elements of the N dissimilarity matrices. A rotatable spatial distribution of the business components, derived from the single dissimilarity matrix, is displayed to a user who subsequently selects one or more business components for usage in a manner that reflects the spatial distances between the displayed business components.

19 Claims, 18 Drawing Sheets

Related U.S. Application Data continuation of application No. 13/917,722, filed on Jun. 14, 2013, now Pat. No. 9,727,833.

(58) Field of Classification Search
USPC .......................................................... 705/7.27
See application file for complete search history.

(56) References Cited

U.S. PATENT DOCUMENTS

| | | | |
|---|---|---|---|
| 8,214,753 B2 | 7/2012 | Aryanto et al. | |
| 8,340,995 B2 | 12/2012 | Flaxer et al. | |
| 8,341,592 B2 * | 12/2012 | Akkiraju | G06Q 10/0637 717/105 |
| 8,489,407 B2 * | 7/2013 | Bradley | G06Q 10/04 705/1.1 |
| 8,924,269 B2 * | 12/2014 | Seubert | G06Q 10/06 705/35 |
| 9,092,824 B2 * | 7/2015 | Akkiraju | G06Q 10/06 |
| 9,727,833 B2 | 8/2017 | Nishimura | |
| 2005/0261953 A1 | 11/2005 | Malek et al. | |
| 2008/0120129 A1 * | 5/2008 | Seubert | G06Q 10/10 705/35 |
| 2008/0172273 A1 | 7/2008 | Rackham | |
| 2010/0082387 A1 * | 4/2010 | Cao | G06Q 10/06 705/7.38 |
| 2012/0011078 A1 | 1/2012 | Padmanabhan | |
| 2014/0046721 A1 | 2/2014 | Nishimura | |
| 2017/0278032 A1 | 6/2017 | Nishimura | |

FOREIGN PATENT DOCUMENTS

| | | |
|---|---|---|
| JP | 2004280820 | 10/2004 |
| JP | 2006048145 | 2/2006 |
| JP | 2006508427 | 3/2006 |
| JP | 2006285955 | 10/2006 |
| JP | 2007048261 | 2/2007 |
| JP | 2010524072 | 7/2010 |

OTHER PUBLICATIONS

Takane et al., Multidimensional Scaling, 61 pages, McGill University.

Delivery Process: Component Business Modeling (CBM), [retrieved on May 16, 2013], Retrieved from the Internet: < http://b01aciwas31c.pok.ibm.com/rmchtml_comp_bus_modeling/index.htm#process.bus.comp_bus_modeling.base-ibm_int/deliveryprocesses/comp_bus_modeling_D635352.html>, 7 pages.

Chapter 3—Least Squares Method, 3.2 Solution when Least Squares Criterion is Defined by Distance, 10 pages.

Chapter 2—Kruskal's Algorithm, 2.1 What is Kruskal's algorithm?, 19 pages.

Office Action (dated Sep. 9, 2016), U.S. Appl. No. 13/917,722, filed Jun. 14, 2013.

Amendment (dated Dec. 9, 2016), U.S. Appl. No. 13/917,722, filed Jun. 14, 2013.

Notice of Allowance (dated Apr. 3, 2017), U.S. Appl. No. 13/917,722, filed Jun. 14, 2013.

312 Amendment (dated May 3, 2017), U.S. Appl. No. 13/917,722, filed Jun. 14, 2013.

Office Action (dated Feb. 7, 2019), U.S. Appl. No. 15/622,612, filed Jun. 14, 2017.

Amendment (dated May 6, 2019), U.S. Appl. No. 15/622,612, filed Jun. 14, 2017.

Notice of Allowance (dated Aug. 8, 2019), U.S. Appl. No. 15/622,612, filed Jun. 14, 2017.

312 Amendment (dated Sep. 27, 2019), U.S. Appl. No. 15/622,612, filed Jun. 14, 2017.

* cited by examiner

FIG. 1 Document Name Drawings (a)

|         | Sapporo | Tokyo | Osaka | Fukuoka | Taipei | Seoul |
|---------|---------|-------|-------|---------|--------|-------|
| Sapporo | 0       | 840   | 1080  | 1420    | 2100   | 1370  |
| Tokyo   | 840     | 0     | 410   | 880     | 2100   | 1160  |
| Osaka   | 1080    | 410   | 0     | 480     | 1790   | 830   |
| Fukuoka | 1420    | 880   | 480   | 0       | 1430   | 540   |
| Taipei  | 2100    | 2100  | 1790  | 1430    | 0      | 960   |
| Seoul   | 1370    | 1160  | 830   | 540     | 960    | 0     |

| | BC1 | BC2 | BC3 | ... | BCM |
|---|---|---|---|---|---|
| BC1 | 0 | $O_{12}$ | $O_{13}$ | ... | $O_{1M}$ |
| BC2 | $O_{21}$ | 0 | $O_{23}$ | ... | $O_{2M}$ |
| BC3 | $O_{31}$ | $O_{32}$ | 0 | ... | $O_{3M}$ |
| ... | ... | ... | ... | ... | ... |
| BCM | $O_{M1}$ | $O_{M2}$ | $O_{M3}$ | ... | 0 |

FIG. 11

|         | Competency 1 | Competency 2 | Competency 3 |
|---------|--------------|--------------|--------------|
| Direct  | BC1          | BC2          | BC3          |
| Control | BC4          | BC5          | BC6          |
| Execute | BC7          | BC8          | BC9          |

FIG. 12

| Number | Order of Execution For Business Components Based on Business Process |
|---|---|
| 1 | BC8 → BC6 → BC1 → BC7 → BC9 → BC4 |
| 2 | BC2 → BC6 → BC8 |
| 3 | BC8 → BC2 → BC8 |
| 4 | BC4 → BC7 → BC2 → BC5 |
| 5 | BC7 → BC9 → BC2 → BC7 → BC8 |
| 6 | BC5 → BC7 → BC5 → BC9 → BC7 |
| 7 | BC3 → BC4 → BC8 → BC6 → BC9 → BC5 → BC4 |
| 8 | BC2 → BC5 → BC8 → BC6 → BC7 → BC3 → BC2 |

FIG. 13

|     | BC1  | BC2  | BC3  | BC4  | BC5  | BC6  | BC7  | BC8  | BC9  |
|-----|------|------|------|------|------|------|------|------|------|
| BC1 | 0.00 |      |      |      |      |      |      |      |      |
| BC2 |      | 0.00 |      |      |      | 1.00 |      | 2.00 |      |
| BC3 |      |      | 0.00 |      |      |      |      |      |      |
| BC4 |      |      |      | 0.00 |      |      |      |      |      |
| BC5 |      |      |      |      | 0.00 |      |      |      |      |
| BC6 |      | 1.00 |      |      |      | 0.00 |      | 1.00 |      |
| BC7 |      |      |      |      |      |      | 0.00 |      |      |
| BC8 |      | 2.00 |      |      |      | 1.00 |      | 0.00 |      |
| BC9 |      |      |      |      |      |      |      |      | 0.00 |

FIG. 14

|     | BC1  | BC2  | BC3  | BC4  | BC5  | BC6  | BC7  | BC8  | BC9  |
|-----|------|------|------|------|------|------|------|------|------|
| BC1 | 0.00 |      |      | 3.00 |      | 1.00 | 1.00 | 2.00 | 2.00 |
| BC2 |      | 0.00 | 3.00 | 2.00 | 2.00 | 2.00 | 1.83 | 2.00 | 1.00 |
| BC3 |      | 3.00 | 0.00 | 3.50 | 4.50 | 2.50 | 1.00 | 2.50 | 4.00 |
| BC4 | 3.00 | 2.00 | 3.50 | 0.00 | 2.75 | 3.25 | 1.50 | 3.75 | 1.75 |
| BC5 |      | 2.00 | 4.50 | 2.75 | 0.00 | 2.00 | 2.33 | 2.00 | 1.50 |
| BC6 | 1.00 | 2.00 | 2.50 | 3.25 | 2.00 | 0.00 | 1.50 | 1.00 | 2.00 |
| BC7 | 1.00 | 1.83 | 1.00 | 1.50 | 2.33 | 1.50 | 0.00 | 2.50 | 1.33 |
| BC8 | 2.00 | 2.00 | 2.50 | 3.75 | 2.00 | 1.00 | 2.50 | 0.00 | 3.00 |
| BC9 | 2.00 | 1.00 | 4.00 | 1.75 | 1.50 | 2.00 | 1.33 | 3.00 | 0.00 |

FIG. 15

|  | Stress | RSQ |
|---|---|---|
| 2-Dimensional Edges | 0.23447 | 0.66606 |
| 3-Dimensional Edges | 0.14925 | 0.75022 |
| 4-Dimensional Edges | 0.09540 | 0.83175 |

| | | | | 3 dimensions | | | | | |
|---|---|---|---|---|---|---|---|---|---|
| | | | Optimally scaled data (disparities) for subject 1 | | | | | | |
| | 1 | 2 | 3 | 4 | 5 | 6 | 7 | 8 | 9 |
| 1 | 0.000 | | | | | | | | |
| 2 | 1.038 | 0.000 | | | | | | | |
| 3 | 1.038 | 3.162 | 0.000 | | | | | | |
| 4 | 3.162 | 2.454 | 3.517 | 0.000 | | | | | |
| 5 | 1.038 | 2.454 | 4.225 | 2.985 | 0.000 | | | | |
| 6 | 1.746 | 2.454 | 2.808 | 3.339 | 2.454 | 0.000 | | | |
| 7 | 1.746 | 2.334 | 1.746 | 2.100 | 2.688 | 2.100 | 0.000 | | |
| 8 | 2.454 | 2.454 | 2.808 | 3.694 | 2.454 | 1.746 | 2.808 | 0.000 | |
| 9 | 2.454 | 1.746 | 3.871 | 2.277 | 2.100 | 2.454 | 1.980 | 3.162 | 0.000 |

(b)

| | | | | 4 dimensions | | | | | |
|---|---|---|---|---|---|---|---|---|---|
| | | | Optimally scaled data (disparities) for subject 1 | | | | | | |
| | 1 | 2 | 3 | 4 | 5 | 6 | 7 | 8 | 9 |
| 1 | 0.000 | | | | | | | | |
| 2 | 1.607 | 0.000 | | | | | | | |
| 3 | 1.607 | 3.544 | 0.000 | | | | | | |
| 4 | 3.544 | 2.898 | 3.867 | 0.000 | | | | | |
| 5 | 1.607 | 2.898 | 4.512 | 3.382 | 0.000 | | | | |
| 6 | 2.253 | 2.898 | 3.221 | 3.705 | 2.898 | 0.000 | | | |
| 7 | 2.253 | 2.789 | 2.253 | 2.576 | 3.111 | 2.576 | 0.000 | | |
| 8 | 2.898 | 2.898 | 3.221 | 4.028 | 2.898 | 2.253 | 3.221 | 0.000 | |
| 9 | 2.898 | 2.253 | 4.189 | 2.737 | 2.576 | 2.898 | 2.466 | 3.544 | 0.000 |

FIG. 17

| Stimulus Number | Stimulus Name | Stimulus Coordinates Dimension | | |
|---|---|---|---|---|
| | | 1 | 2 | 3 |
| 1 | BC1 | -0.6207 | -0.3424 | -0.7657 |
| 2 | BC2 | 0.3975 | -0.1450 | -1.2557 |
| 3 | BC3 | -2.2526 | 0.8489 | -0.1501 |
| 4 | BC4 | 1.1898 | 1.8809 | 0.1663 |
| 5 | BC5 | 1.2936 | -1.2738 | -0.3731 |
| 6 | BC6 | -0.4421 | -0.8175 | 1.1460 |
| 7 | BC7 | -0.3943 | 1.0740 | 0.2715 |
| 8 | BC8 | -0.8126 | -1.4941 | 0.8280 |
| 9 | BC9 | 1.6413 | 0.2692 | 0.1328 |

ANALYSIS OF DISSIMILARITY AMONG BUSINESS COMPONENTS

This application is a continuation application claiming priority to Ser. No. 15/622,612, filed Jun. 14, 2017, now U.S. Pat. No. 10,600,016, issued Mar. 24, 2020, which is a continuation of Ser. No. 13/917,722, filed Jun. 14, 2013, issued Aug. 8, 2017, U.S. Pat. No. 9,727,833.

TECHNICAL FIELD

The present invention relates generally to providing information about business components, and more specifically to analysis of dissimilarity among business components.

BACKGROUND

Business modeling has become increasingly important n recent years to optimize business as a whole in companies and other organizations. However, current business modeling does not adequately analyze dissimilarity among business components.

BRIEF SUMMARY

The present invention provides a method for analyzing dissimilarity among business components of a business, said method comprising:

identifying, by a processor of a computer system, N business processes of the business, N being at least 1, each business process comprising a sequence of activities to be executed in a specified sequential order, each activity in the sequence assigned a unique sequence number monotonically increasing with increasing sequential position in the sequential order with respect to the first activity in the sequence, each activity in the sequence being associated with a single business component of a plurality of business components of the business;

for a first and second activity in each pair of different activities of the sequence of activities of each business process, said processor: determining a pair of a first and second business component to which the first and second business activity is respectively associated, determining a dissimilarity measure equal to a magnitude of a difference of the respective sequence numbers of the first and second business activities, and assigning the dissimilarity measure to the pair of the first and second business component;

for each business process of the N business processes, said processor generating a two-dimensional symmetric dissimilarity matrix in which the rows and columns denote the business components of the business, wherein each diagonal element of the matrix comprises zero, and wherein each off-diagonal element of the matrix is specific to a pair of two different business components and (i) comprises an only dissimilarity measure assigned to the pair of two different business components, (ii) comprises a mean of a plurality of dissimilarity measures assigned to the pair of two different business components, or (iii) is blank which denotes that no dissimilarity measure has been assigned to the pair of two different business components; and said processor storing the N dissimilarity matrices in respective storage units or in a single storage unit.

The present invention provides a computer program product, comprising a computer readable storage device having computer readable program code stored therein, said program code containing instructions which, upon being executed by a processor of a computer system, implement to implement a method for analyzing dissimilarity among business components of a business, said method comprising:

said processor identifying N business processes of the business, N being at least 1, each business process comprising a sequence of activities to be executed in a specified sequential order, each activity in the sequence assigned a unique sequence number monotonically increasing with increasing sequential position in the sequential order with respect to the first activity in the sequence, each activity in the sequence being associated with a single business component of a plurality of business components of the business;

for a first and second activity in each pair of different activities of the sequence of activities of each business process, said processor: determining a pair of a first and second business component to which the first and second business activity is respectively associated, determining a dissimilarity measure equal to a magnitude of a difference of the respective sequence numbers of the first and second business activities, and assigning the dissimilarity measure to the pair of the first and second business component;

for each business process of the N business processes, said processor generating a two-dimensional symmetric dissimilarity matrix in which the rows and columns denote the business components of the business, wherein each diagonal element of the matrix comprises zero, and wherein each off-diagonal element of the matrix is specific to a pair of two different business components and (i) comprises an only dissimilarity measure assigned to the pair of two different business components, (ii) comprises a mean of a plurality of dissimilarity measures assigned to the pair of two different business components, or (iii) is blank which denotes that no dissimilarity measure has been assigned to the pair of two different business components; and said processor storing the N dissimilarity matrices in respective storage units or in a single storage unit.

The present invention provides a computer system comprising a processor, a memory coupled to the processor, and a computer readable storage device coupled to the processor, said storage device containing program code which, upon being executed by the processor via the memory, implements a method for analyzing dissimilarity among business components of a business, said method comprising:

said processor identifying N business processes of the business, N being at least 1, each business process comprising a sequence of activities to be executed in a specified sequential order, each activity in the sequence assigned a unique sequence number monotonically increasing with increasing sequential position in the sequential order with respect to the first activity in the sequence, each activity in the sequence being associated with a single business component of a plurality of business components of the business;

for a first and second activity in each pair of different activities of the sequence of activities of each business process, said processor: determining a pair of a first and second business component to which the first and second business activity is respectively associated, determining a dissimilarity measure equal to a magnitude of a difference of the respective sequence numbers of the first and second business activities, and assigning the dissimilarity measure to the pair of the first and second business component;

for each business process of the N business processes, said processor generating a two-dimensional symmetric dissimilarity matrix in which the rows and columns denote the business components of the business, wherein each diagonal element of the matrix comprises zero, and wherein each off-diagonal element of the matrix is specific to a pair of two different business components and (i) comprises an only dissimilarity measure assigned to the pair of two different business components, (ii) comprises a mean of a plurality of dissimilarity measures assigned to the pair of two different business components, or (iii) is blank which denotes that no dissimilarity measure has been assigned to the pair of two different business components; and said processor storing the N dissimilarity matrices in respective storage units or in a single storage unit.

BRIEF DESCRIPTION OF THE DRAWINGS

FIG. 5 is a diagram showing a dissimilarity matrix representing dissimilarity measures in matrix form, in accordance with embodiments of the present invention.

FIG. 11 is a diagram showing an example of a virtual CBM, in accordance with embodiments of the present invention.

FIG. 12 is a diagram showing an example of an order of execution for business components based on a virtual business process, in accordance with embodiments of the present invention.

FIG. 13 is a diagram showing a dissimilarity matrix obtained from a second business process among the virtual business processes, in accordance with embodiments of the present invention, FIG. 14 is a diagram showing a dissimilarity matrix obtained by all of the virtual business processes, in accordance with embodiments of the present invention.

FIG. 15 is a diagram showing the stresses and determination coefficients (RSQ) when two-dimensional edges, three-dimensional edges and four-dimensional edges are selected, in accordance with embodiments of the present invention.

FIG. 16 is a diagram showing the distances between points in three-dimensional edges and four-dimensional edges, in accordance with embodiments of the present invention.

FIG. 17 is a diagram showing the coordinates of three-dimensional edges, in accordance with embodiments of the present invention.

DETAILED DESCRIPTION

Figure 1:
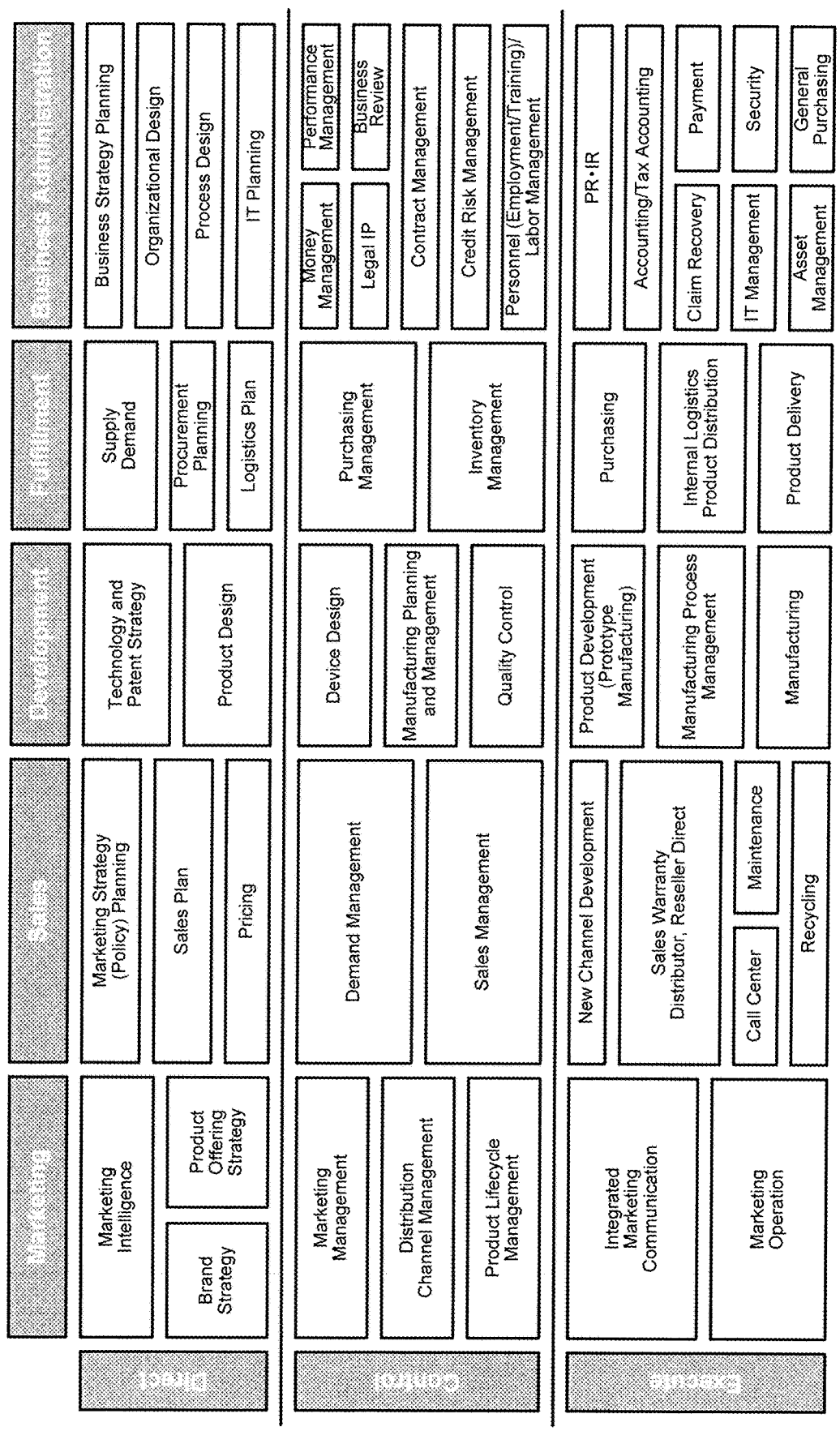
FIG. 1 is a diagram showing an example of component business modeling (CBM), in accordance with embodiments of the present invention.

The following is a detailed description of the present invention with reference to the drawings.

A purpose of the present invention is to visualize relationships among business components obtained by dividing a business into units that function independently.

In order to achieve this purpose, the present invention provides a device for visualizing relationships among business components obtained by dividing a business into units that function independently, the device comprising: a determining unit for determining, for each two business components, the degree of association of the two business components so that the degree of association is higher when the places in the order in which the two business components are to be executed in the business process are closer to each other than when the places in the order are farther apart; a generating unit for generating a coordinate, the coordinate indicating the position of a corresponding component in the space of a particular dimension calculated by multidimensional scaling using the degree of association between each two business components determined by the determining unit as an input; and an presentation unit for visualizing the coordinate generated by the generating unit.

The device may also include: a first storage unit to store the business process that includes activities and the order of execution of activities; a second storage unit to store the information about the relationship between an activity and a corresponding business component; and a evaluating unit to evaluate the order of execution of business components using the information about business process stored in the first storage unit and the corresponding information about business component stored in the second storage unit; and the determining unit to determine the degrees of association among business components in the business process, the degrees of association among business components being given a high value when the order of execution of business components in the business process are close.

The present invention is also a device for providing information related to a plurality of business components obtained by dividing a business into units that function independently, the device comprising: a first storage unit for storing N business processes including the plurality of activities organized in the order of execution; a second storage unit for storing N correspondence information indicating the correspondence between the plurality of activities and the plurality of business components in the business process for each of N business processes; a recognizing unit for recognizing the order for executing business components in each of the N business processes based on the N business processes stored in the first storage unit and the N correspondence information stored in the second storage unit; a first determining unit for determining, for each of a plurality of sets of two business components among the plurality of business components, N degrees of association based on the two business components in the set for N business processes so that the degree of association is higher when the places in the order in which the two business components are to be executed in the business process are closer to each other than when the places in the order are farther apart; a second determining unit for determining, for each of a plurality of sets of two business components among the plurality of business components, a degree of association based on the two business components in the set of all N business processes and based on the N degrees of association determined by the first determining unit; a generating unit for generating position information, the position information indicating the positions corresponding to the plurality of components in the space of a particular dimension by applying multidimensional scaling to the degree of association of each of the plurality of sets determined by the second determining unit, and the position information reflecting the degree of association between two business components among the plurality of business components in the distance between the positions corresponding to the two business components; and a display unit for displaying the position information generated by the generating unit.

Here, the second determining unit may calculate the single value of degree of association by taking the arithmetic mean of the N degrees of association. Also, the second determining unit may use the weighted mean to make consideration about the frequency of execution of a business process or the amount of data that passes in the business process for the same objective.

The present invention also includes a method for providing information related to a plurality of business components obtained by dividing a business into units that function independently, the method comprising the steps of: determining, for each of a plurality of sets of two business components among the plurality of business components, the degree of association of the two business components in the set so that the degree of association is higher when the places in the order in which the two business components are to be executed in the business process are closer to each other than when the places in the order are farther apart; generating position information, the position information indicating the positions corresponding to the plurality of components in the space of a particular dimension by applying multidimensional scaling to the degree of association of each of the plurality of sets determined by the determining step, and the position information reflecting the degree of association between two business components among the plurality of business components in the distance between the positions corresponding to the two business components; and outputting the generated position information.

The present invention also includes a program causing a computer to function as a device for providing information related to a plurality of business components obtained by dividing a business into units that function independently, the program causing the computer to function as: a determining unit for determining, for each of a plurality of sets of two business components among the plurality of business components, the degree of association of the two business components in the set so that the degree of association is higher when the places in the order in which the two business components are to be executed in the business process are closer to each other than when the places in the order are farther apart; a generating unit for generating position information, the position information indicating the positions corresponding to the plurality of components in the space of a particular dimension by applying multidimensional scaling to the degree of association of each of the plurality of sets determined by the determining unit, and the position information reflecting the degree of association between two business components among the plurality of business components in the distance between the positions corresponding to the two business components; and an output unit for outputting the position information generated by the generating unit.

The present invention is able to present information related to the association of a plurality of business components obtained by dividing a business into units that function independently.

The example used in the explanation of embodiments of the present invention is component business modeling (CBM), which is a business modeling method provided b the present applicant. First, CBM will be explained.

When a system is to be rebuilt on a company-wide scale, the direction of the next-generation system may be derived using some evidence. When an attempt is made to come up with a direction for the next-generation system in a bottom-up manner (by gathering opinions at the sites of system development), the next generation system will satisfy people in the sites of system development but it won't fit the medium-and long-term business strategy in the company. Reaching a conclusion in the bottom-up approach is also very time- and labor-intensive, because an enormous amount of design information related to the existing system has to be inputted to extract problems with the current system, and strategies have to be devised for dealing with the extracted problems. Because of these problems, senior management has to be involved as members of the study team when redesigning a system on a company-wide basis, and a top-down rather than a bottom-up approach has to be applied to come up with a direction for the next-generation system. However, because senior management does not have deep knowledge of the system, the direction of the next-generation system cannot be studied on the level of the system itself. In such situations, CBM is used.

FIG. 1 is a diagram showing an example of component business modeling (CBM) of a company, in accordance with embodiments of the present invention. CBM is a modeling method which expresses the business functions of the company in the form of a two-dimensional matrix. The horizontal axis indicates the value chain. In CBM, these are called business competencies. The vertical axis indicates the operation hierarchy represented by 'Direct', 'Control', and 'Execute'. 'Direct' means planning, and determining direction or policy. 'Control' means management, and is modeled to manage 'Execute' and correct the course of 'Direct'. 'Execute' means carry out, and refers to actual operations based on 'Direct' or 'Control'.

In CBM, each business component is classified based on certain criteria as either an important business component (called 'hot components') or not. For example, business component 'purchasing' in FIG. 1 is not an important business component because it doesn't contribute a differentiation from other companies for survival. As such, it is more economical to use a commercially available software package in the information system supporting purchases. Conversely, 'procurement planning', 'manufacturing process management' and 'sales management' in FIG. 1 are hot components which differentiate the company from other companies, so flexible, 'hand-made' applications ought to be used to support these components. This is because company growth will depend on outside vendors if a commercially available software package is introduced in these hot components.

Such a major policy for a next-generation system cannot be derived by focusing attention on peripheral information on problems with the current system: When reconstructing a system on a company-wide scale, it is effective to conduct discussions using a model at a high level of abstraction that intentionally excludes peripheral information. CBM is a model that embodies this. When reconstructing a system on a company-wide scale, CBM takes the following into consideration:

(1) Studying the scope of the reconstruction and evaluating the possibility of outsourcing;
(2) Evaluating the possibility of repurposing the existing system; and
(3) Studying the strategic introduction of software packages.

In the case of (1), CBM classifies business components categorized as business components that contribute to differentiation from other companies ('hot components') and business components that do not contribute to this end, and considers the introduction of 'hand-made' systems to business components contributing to this differentiation. In the case of business components that do not contribute to this differentiation, the information system used to support these business components is not considered in isolation. The use of external professional services is also considered as an alternative with a view towards large-scale restructuring up to and including the fixed assets and human resources.

In the case of (2), business components that may continue to use existing system are identified. Even when a system s reconstructed on a company-wide basis, there are a reasonable number of business components that can continue to use the existing system. Because shareholders have become more vigilant regarding wasteful IT spending in recent years, having compelling reasons for repurposing existing systems is important for senior management decision-making.

In the case of (3), business components are identified which do not require flexibility such as 'hand-made' software even though these business components are included in the restructuring. This is part of a trend in IT investment, and is also a concern of shareholders. Management does not need to have deep knowledge of the system to come to a decision on these issues. It only has to convince those involved in the process. CBM is effective in this regard.

While CBM comprehensively expresses the functions required for business, it does not address the relationships between functions. For example, business component 'sales management' and business component 'manufacturing process management' in FIG. 1 are space apart from each other in a two-dimensional matrix, and the close relationship between the two cannot be understood simply by looking at the CBM. However, the customer has to be informed of a delivery data when a product is ordered. When there is no product in inventory, sales examines available production capacity on the production line in real time when the order is placed in order to calculate a delivery date. Therefore, the system that supports business component 'sales management' and the system that supports business component 'manufacturing process management' need to work together closely. Therefore, a high affinity between these two systems is required. Ideally, the platform should be integrated by the same vendor.

Because CBM comprehensively expresses the functions required for business but does not provide information on the relationship between functions, management may come up with a faulty system-wide strategy when CBM is used alone. In order to come up with a direction for a next-generation system using CBM, the relationship between business components expressed in CBM has to be clarified somehow.

To address this problem, the present invention associates business processes with business components. Here, individual activities that constitute a business process are mapped to a single business component. In this way, the relationship between business components called the "order of execution" is defined via the intermediary of a business process.

Figure 2:
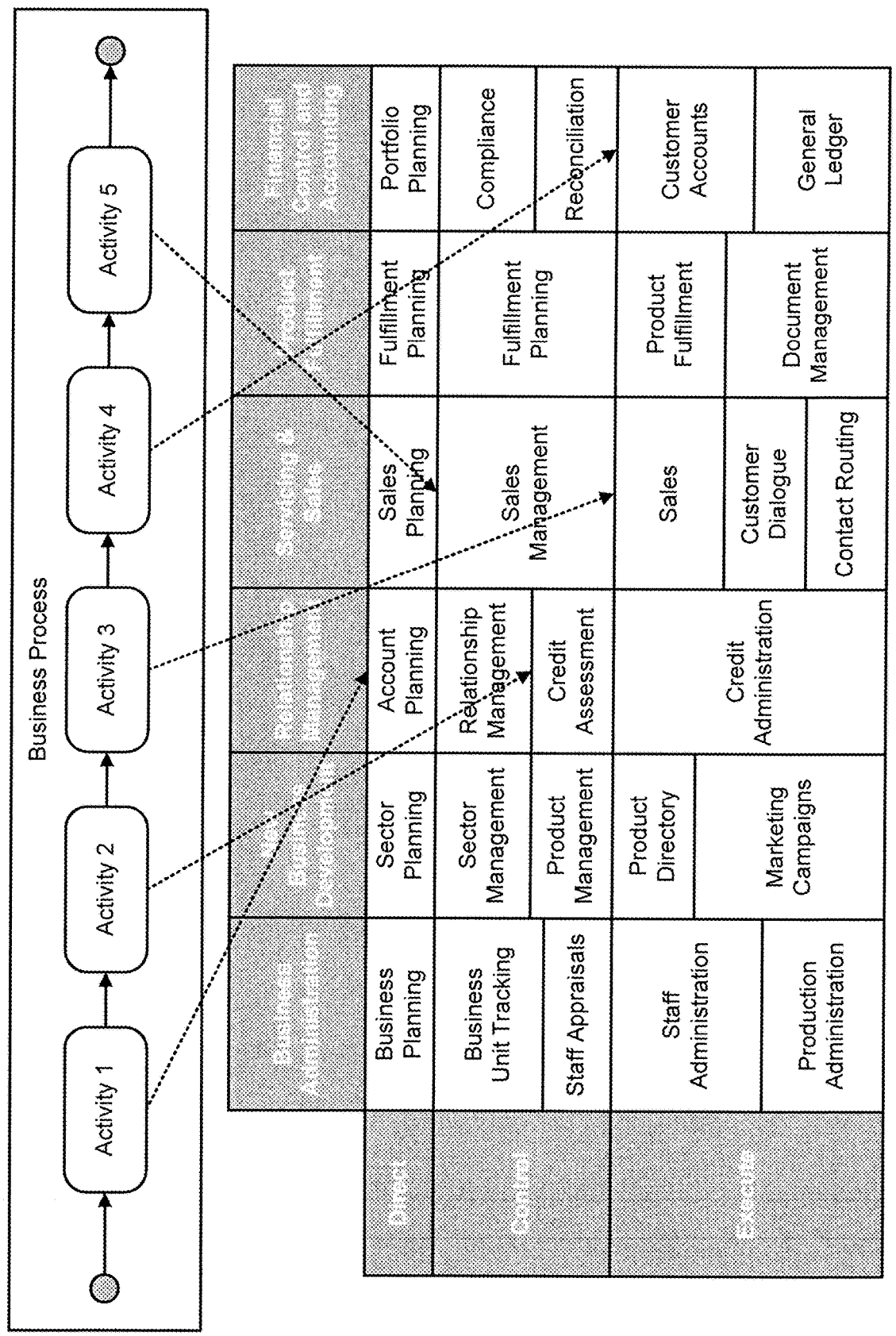
FIG. 2 is a diagram showing an example of an order of execution defined among business components, in accordance with embodiments of the present invention.

FIG. 2 is a diagram showing an example of an order of execution defined among business components, in accordance with embodiments of the present invention. FIG. 2 shows a business process composed of five activities. In this business process, each activity is associated with a single business component (i.e., one and only one business component) as indicated by dashed arrows, and the "order of execution" defined between business components by the business process is 'Account Planning', 'Credit Assessment', 'Sales', 'Customer Accounts', and 'Sales Management'.

If the company to be studied has, for example, 100 business processes, it is possible to define a number of "orders of execution" between business components, but this alone is insufficient as analysis. Because there is value in drawing out characteristics based on collected information that were not apparent until doing so, simply clarifying and recording the order of execution does not provide new insight. However, a method which clarifies the relationship between business components on the basis of collected information has not yet been developed prior to the present invention. In many cases, the correspondence between the business components and activities is simply recorded. Therefore, in the present embodiment, a solution to this problem is proposed in which the relationship between business components is represented visually using a statistical method.

The following is a brief description of multidimensional scaling (MDS), which is the statistical technique used in the present embodiment. MDS provides the way to plot objects in the multidimensional space when a measurement indicating the degree of similarity or dissimilarity between objects is given. This means MDS uses similarity and dissimilarity between every two objects as distance in the multidimensional space The concept of similarity or dissimilarity appears here. The concept of similarity or dissimilarity plays a very important role in the behavioral sciences such as psychology, and in science that focuses on human knowledge. Similarity is also called affinity (proximity). This concept expresses the degree to which two objects are similar in some sense. Dissimilarity is the opposite of similarity, and is a concept that expresses the degree to which objects are not similar.

Figure 3:
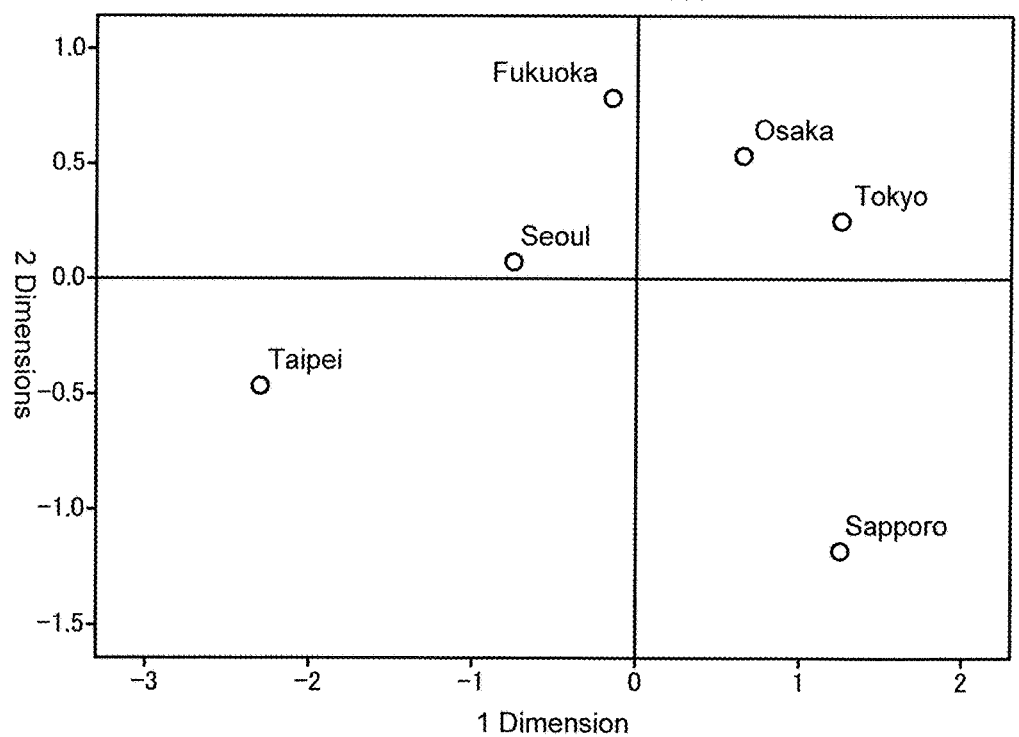
FIG. 3 is a diagram used to explain multidimensional scaling (MDS), in accordance with embodiments of the present invention.

FIG. 3 is a diagram used to explain multidimensional scaling (MDS), in accordance with embodiments of the present invention. In this example, a world map is referenced to determine the distance among various cities: Sapporo, Tokyo, Osaka, Fukuoka, Seoul, and Taipei (units: km). In this drawing, (a) is a dissimilarity matrix obtained when the distance between each city is considered as a measure expressing the degree of dissimilarity (referred to as a "dissimilarity measure" below). MDS reproduces a map using only information from the dissimilarity matrix. In the drawing, (b) shows the map reproduced from the dissimilarity matrix in (a).

MDS is a technique that calculates coordinates of objects in multidimensional space using dissimilarity measures as distance, and reveals the structure of factor that define nature of the objects. This means the dissimilarity between every two objects plays as the same role of the distance between every two objects located in multidimensional space.

Figure 4:
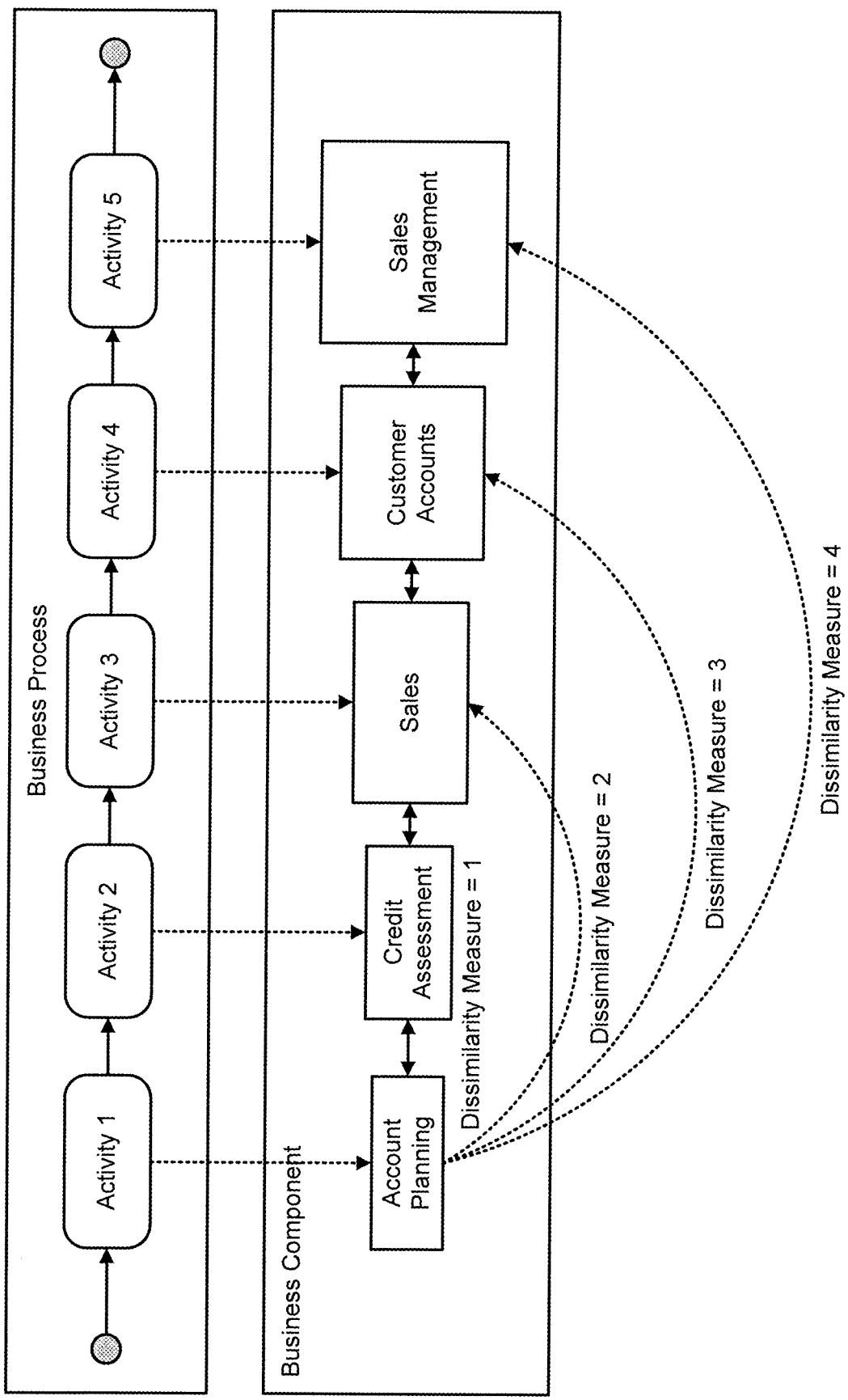
FIG. 4 is a diagram showing a method used to define dissimilarity measures among business components, in accordance with embodiments of the present invention.

By the way, it is necessary to obtain the measure of dissimilarity between business components for a visual representation of the relationship between the business components. In the present embodiment, a business process is used. FIG. 4 is a diagram showing the method used to define dissimilarity measures among business components, in accordance with embodiments of the present invention. It is also assumed, as shown in FIG. 2, that a business process is composed of several activities, and that each activity is associated with a single business component. In the present embodiment, the measure of dissimilarity is defined so that a measure of dissimilarity between business components corresponding to adjacent activities is smaller, and the measure of dissimilarity between activities located at the beginning and end of the business process is the largest. In other words, the degree of dissimilarity takes into account the separation between activities. The dissimilarity measures depicted in FIG. 4 reflect an embodiment in which the sequence numbers (1, 3, 4, 5) of successive activities in the sequence of activities 1-5 for a business process monotonically increase by a constant numerical value, namely "1" in the embodiment of FIG. 4.

FIG. 5 is a diagram showing a dissimilarity matrix representing dissimilarity measures in matrix form, in accordance with embodiments of the present invention. A dissimilarity matrix represents measures of dissimilarity obtained for all business processes. When plural dissimilarity measures are obtained between business component i and business component j from all business processes, calculation of the arithmetic mean of these plural dissimilarity measures gives a single dissimilarity measure. A point to note here is the handling of missing values. Even when all business processes have been inputted, a measure of dissimilarity for all of the business components will not necessarily be obtained. In this situation, the dissimilarity matrix may include missing values. However, depending on the number of objects, if ¼ to ½ of all elements in the dissimilarity matrix is obtained, the result is similar to one using all elements in the dissimilarity matrix. Each element $\delta_{jk}$ of the dissimilarity matrix is called a "dissimilarity measure".

The following is a brief description of Kruskal's solution which can be employed as an implementation of MDS. For more information regarding Kruskal's solution, see Yoshio Takane, "Multidimensional Scaling", University of Tokyo Press, 1980, and Akinori Okata and Tadashi Imaizumi, "Multidimensional Scaling for PCs", Kyoritsu Shuppan, 1994. In this description, let the number of objects be n. First, the number of dimensions in the space is set at p, and the provisional locations of then points in this space is determined. The provisional locations of the points are called the initial edges. Next, the distances (d) between points in this space is calculated. If the distance between points is not the relationship between the dissimilarity measure and the weak monotonic increase, if $\delta_{jk} < \delta_{lm}$ then $d_{jk} \leq d_{lm}$ (Equation 1)

then the degree of nonconformity S called stress is defined as follows:

$$S = \sqrt{\frac{\sum_{j=1}^{n-1}\sum_{k=j+1}^{n}(d_{jk}-\hat{d}_{jk})^2}{\sum_{j=1}^{n-1}\sum_{k=j+1}^{n}(d_{jk}-\bar{d})^2}}$$ (Equation 2)

Here, $\bar{d}$ is the mean of the distance between points.

$$\bar{d} = \frac{\sum_{j=1}^{n-1}\sum_{k=j+1}^{n} d_{jk}}{{}_nC_2}$$ (Equation 3)

Where $\hat{d}$ is the disparity, if $\delta_{jk} < \delta_{lm}$ then $\hat{d}_{jk} \leq \hat{d}_{lm}$ (Equation 4)

In other words, the disparity is the weak monotonic increase relative to the dissimilarity measure.

The disparity is determined in the following manner using a monotonic regression method based on Kruskal's monotonicity principle. The disparity is denoted below by d^. If the distance between points is the relationship between the dissimilarity measure and the weak monotonic increase, the distance between points $d_{gh}$ is used as the disparity $\hat{d}_{gh}$. If the distance between points is not the relationship between the dissimilarity measure and the weak monotonic increase, the mean value of the distance between points in the range not related to the weak monotonic increase is used as the disparity. For example, if distances-between-points $d_{jk}$ and $d_{lm}$ are not related to the weak monotonic increase relative to dissimilarity measures $\delta_{jk}$ and $\delta_{lm}$, then the mean value of $d_{jk}$ and $d_{lm}$ [$(d_jk+d_{lm})/2$] is used as disparity $\hat{d}_{jk}$ and $\hat{d}_{lm}$. The difference between the distance between points and the disparity ($d_{gh}-\hat{d}_{gh}$) indicates the deviation from the dissimilarity measure of distance-between-points $d_{gh}$. On the right side of Equation 2, the numerator is the sum of the squares of the deviations, and the denominator is the normalizing term. In order to determine an edge which minimizes stress, the locations of the points in multidimensional space are gradually improved, and the stress is reduced recursively. When iterations have been continued until the stress can no longer be improved further, an edge has been obtained in which stress has been minimized. In order to determine the edge in which stress has been minimized in several different dimensions, the values of minimized stress are examined, and a single edge is selected as the solution.

In one embodiment, the stress is a measure of deviation between the distances between points in the space of p dimensions and the respective elements (dissimilarity measures) in the dissimilarity matrix, subject to the stress being normalized to have a specified range of values (e.g., between 0 and 1). The points in the space of p dimensions are the points that minimize the stress (i.e., the measure of deviation). Any applicable measure of deviation known in the art of multidimensional scaling may be used, and any mathematical or computational method known in the art for minimizing the measure of deviation may be utilized to determine the points in the space of p dimensions. In one embodiment, the measure of deviation is a root mean square (RMS) deviation between the distances between points in the space of p dimensions and the respective elements (dissimilarity measures) in the dissimilarity matrix.

The following is an explanation of a business modeling device that performs these operations. Business modeling software is installed in the business modeling device to model the business process. The business modeling software is equipped with the ability to simulate on paper the time required to execute the business process, and is widely used in consulting projects related to business turnarounds, and in software development projects using service-oriented architecture (SOA). In the following explanation, N business processes are defined by the business modeling device.

Figure 6:
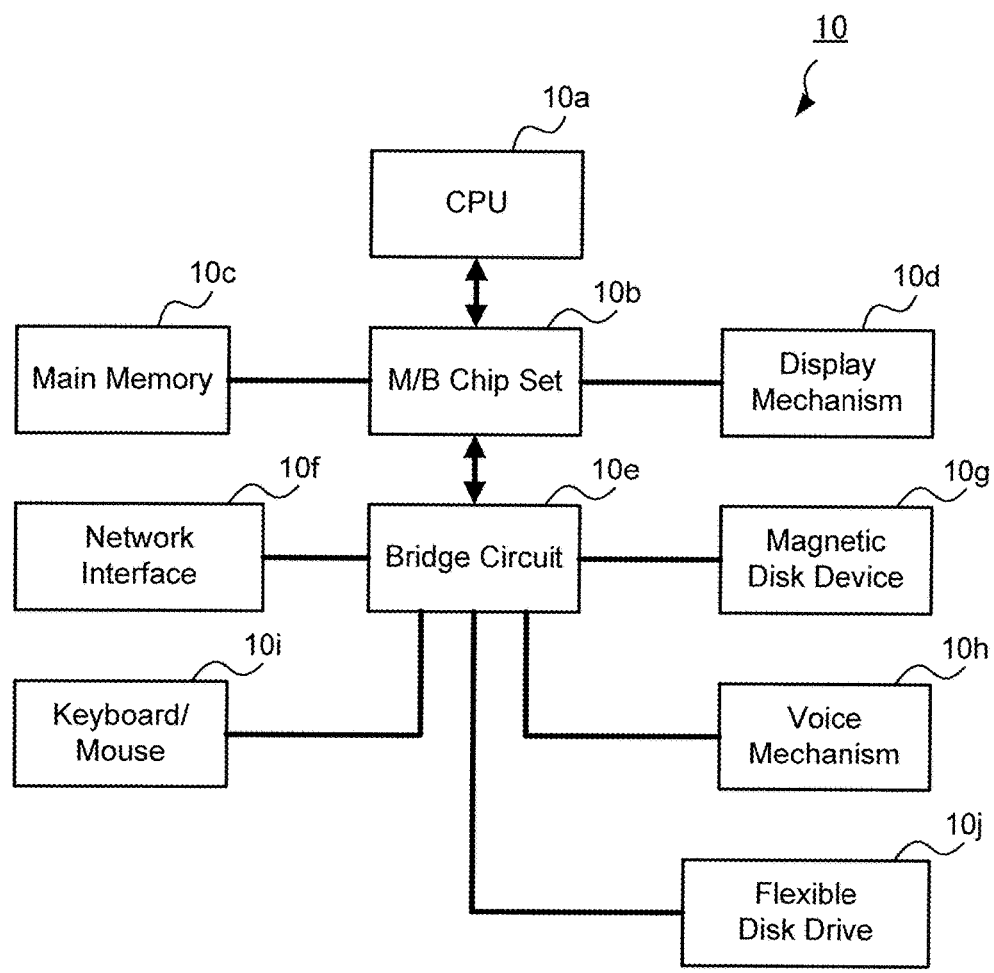
FIG. 6 is a diagram showing an example of a hardware configuration for a business modeling device, in accordance with embodiments of the present invention.

FIG. 6 is a diagram showing an example of a hardware configuration for the business modeling device 10, in accordance with embodiments of the present invention. The device may be comprised by a computer or a computer system. As shown in the drawing, the business modeling device 10 has a central processing unit (CPU) 10a, main memory 10c connected to the CPU 10a via a motherboard (M/B) chipset 10b, and a display mechanism 10d connected to the CPU 10a via the M/B chipset 10b. The M/B chipset 10b is connected via a bridge circuit 10e to a network interface 10f, magnetic disk device (HDD) 10g, voice mechanism 10h, keyboard/mouse 10i, and flexible disk drive 10j. In addition, a voice mechanism 10h is connected to the bridge circuit 10e.

In FIG. 6, the various configuration elements are connected via a bus. For example, the CPU 10a and the M/B chipset 10b, and the M/B chipset 10b and the main memory 10c, are connected via the CPU bus. The M/B chipset 10b and the display mechanism 10d may be connected via an accelerated graphics port. However, when the display mechanism 10d includes a PCI Express-compatible video card, the M/B chipset 10b and the video card may be connected via a PCI Express (PCIe) bus. Also, when connected to the bridge circuit 10e, PCI Express can be used by the network interface 10f Also, the magnetic disk device 10g can use serial ATA (AT Attachment), parallel ATA, or PCI (Peripheral Components Interconnect). The keyboard/mouse 10i and the flexible disk drive 10j can use a USB (Universal Serial Bus).

Figure 7:
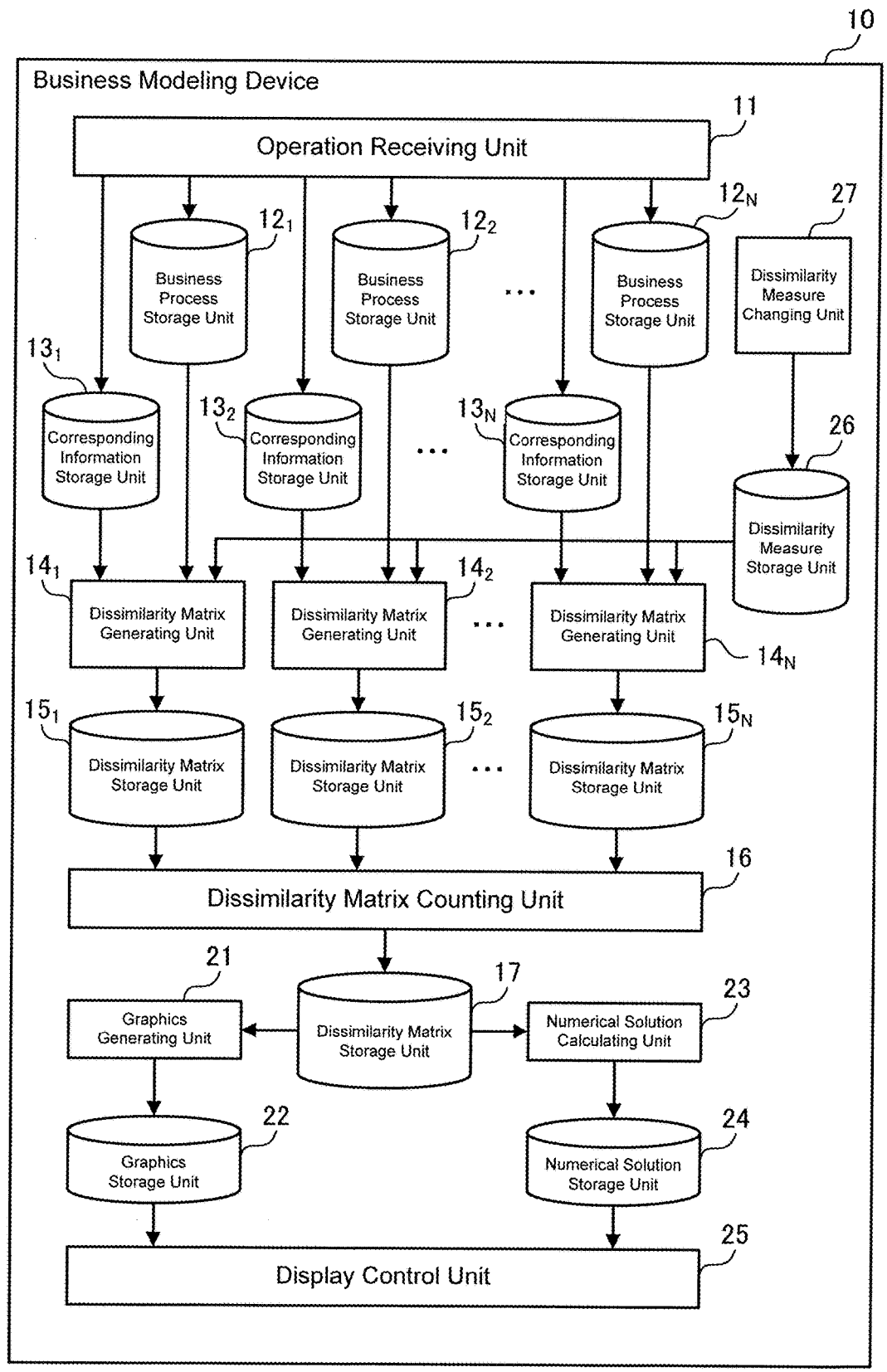
FIG. 7 is a block diagram showing an example of a function configuration for a business modeling device, in accordance with embodiments of the present invention.

FIG. 7 is a block diagram showing an example of a function configuration for the business modeling device 10, in accordance with embodiments of the present invention. As shown in the drawing, the business modeling device 10 includes an operation receiving unit 11, business process storage units $12_1, 12_2, \ldots, 12_N$, correspondence information storage units $13_1, 13_2, \ldots, 13_N$, dissimilarity matrix generating units $14_1, 14_2, \ldots, 14_N$, and dissimilarity matrix storage units $15_1, 15_2, \ldots, 15_N$. The business modeling device 10 also includes a dissimilarity matrix counting unit 16 and a dissimilarity matrix storage unit 17. In addition, the business modeling device 10 includes a graphics generating unit 21, a graphics storage unit 22, a numerical solution calculating unit 23, a numerical solution storage unit 24, and a display control unit 25. Furthermore, the business modeling device 10 includes a dissimilarity measure storage unit 26 and a dissimilarity measure changing unit 27.

The operation receiving unit 11 receives user operations creating a business process, and user operations associating business components with activities included in the business process. The business process storage units $12_K$ store a business process when the operation receiving unit 11 receives a user operation creating the business process (K=1, 2, ..., N). In the present embodiment, one of the business process storage units $12_1, 12_2, \ldots, 12_N$ is an example of a first storage unit for storing a business process, and all of the business process storage units $12_1, 12_2, \ldots, 12_N$ are examples of first storage units for storing N business processes. The correspondence information storage units $13_K$ store correspondence information indicating the correspondence between activities and business components when the operation receiving unit 11 receives a user operation associating a business component with an activity included in a business process stored in a business process storage unit $12_K$ (K=1, 2, ..., N). In the present embodiment, one of the correspondence information storage units $13_1, 13_2, \ldots, 13_N$ is an example of a second storage unit for storing correspondence information, and all of the correspondence information storage units $13_1, 13_2, \ldots, 13_N$ are examples of second storage units for storing N correspondence information.

A dissimilarity matrix generating unit $14_K$ calculates the measure of dissimilarity between activities from a business process stored in a business process storage unit $12_K$, and references the correspondence information stored in a correspondence information storage unit $13_K$ to determine the measure of dissimilarity between business components. It then creates a dissimilarity matrix in which the measure of dissimilarity between business component i and business component j is the element in row i, column j (K=1, 2, ..., N). The measure of dissimilarity is a default value prepared by the business modeling device 10 unless customized by dissimilarity measure changing unit 27 described below. In the present embodiment, a business component is used as an example of a business element, and a measure of dissimilarity is used as an example of a degree of association. Also, one of the dissimilarity matrix generating units $14_1, 14_2, \ldots, 14_N$ is an example of a recognizing unit for recognizing the order in which two business elements in the business process are executed, and all of the dissimilarity matrix generating units $14_1, 14_2, \ldots, 14_N$ are examples of recognizing units for recognizing the order in which business elements are executed in N business processes. Also, one of the dissimilarity matrix generating units $14_1, 14_2, \ldots, 14_N$ is an example of a determining unit for determining the degree of association between two business elements, and all of the dissimilarity matrix generating units $14_1, 14_2, \ldots, 14_N$ are examples of determining units for determining N degrees of association based on two business elements in N business processes. The dissimilarity matrix storage units $15_K$ store the dissimilarity matrices generated by the dissimilarity matrix generating units $14_K$ (K=1, 2, ..., N).

The dissimilarity matrix counting unit 16 counts the N dissimilarity matrices stored in the matrix storage units $15_1, 15_2, \ldots, 15_N$, and creates a single dissimilarity matrix. In the present embodiment, the dissimilarity matrix counting unit 16 is provided as an example of a second determining unit for determining the degree of associations between two business elements based on all N business processes. The dissimilarity matrix storage unit 17 stores the single dissimilarity matrix created by the dissimilarity matrix counting unit 16.

The graphics generating unit 21 creates graphics data of two-dimensional edges and three-dimensional edges using MDS from the single dissimilarity matrix stored in the dissimilarity matrix storage unit 17. In the present embodiment, the graphics generating unit 21 is provided as an example of a generating unit for generating position information. Here, the position information indicates the positions corresponding to the plurality of components in the space of a particular dimension, and the position information reflects the degree of association between two business components among the plurality of business components in the distance between the positions corresponding to the two business components. The graphics storage unit 22 stores graphics data created by the graphics generating unit 21.

The numerical solution calculating unit 23 determines a numerical solution using MDS from the single dissimilarity matrix stored in the dissimilarity matrix storage unit 17. Unlike the graphics generating unit 21, the numerical solution calculating unit 23 outputs information on four-dimensional edges. In the present embodiment, a numerical solution calculating unit 23 is provided as an example of a generating unit for generating position information using a numerical solution. Here, the position information indicates the positions corresponding to the plurality of components in the space of a particular dimension, and the position information reflects the degree of association between two business components among the plurality of business components in the distance between the positions corresponding to the two business components. The numerical solution storage unit 24 stores the numerical solution determined by the numerical solution calculating unit 23.

The display control unit 25 performs controls so the graphics data stored in the graphics storage unit 22 or the numerical solution stored in the numerical solution storage unit 24 is displayed by the display mechanism 10d (see FIG. 6). In the present embodiment, the display control unit 25 is provided as an example of an output unit for outputting position information and an example of a display unit for displaying graphics representing position information.

The dissimilarity measure storage unit 26 stores the dissimilarity measures used by dissimilarity matrix generating units $14_1, 14_2, \ldots, 14_N$. For example, one is stored as a measure of dissimilarity between adjacent business components, two is stored as a measure of dissimilarity between business components two apart, and three is stored as a measure of dissimilarity between business components three apart. However, the relationship between the degree of separation between business components and the measure of dissimilarity is not limited to this. The dissimilarity measure changing unit 27 customizes the measure of dissimilarity stored in the dissimilarity measure storage unit 26. For example, this is customized when a default value for the measure of dissimilarity prepared by the business modeling device 10 is stored in the dissimilarity measure storage unit 26.

Figure 8:
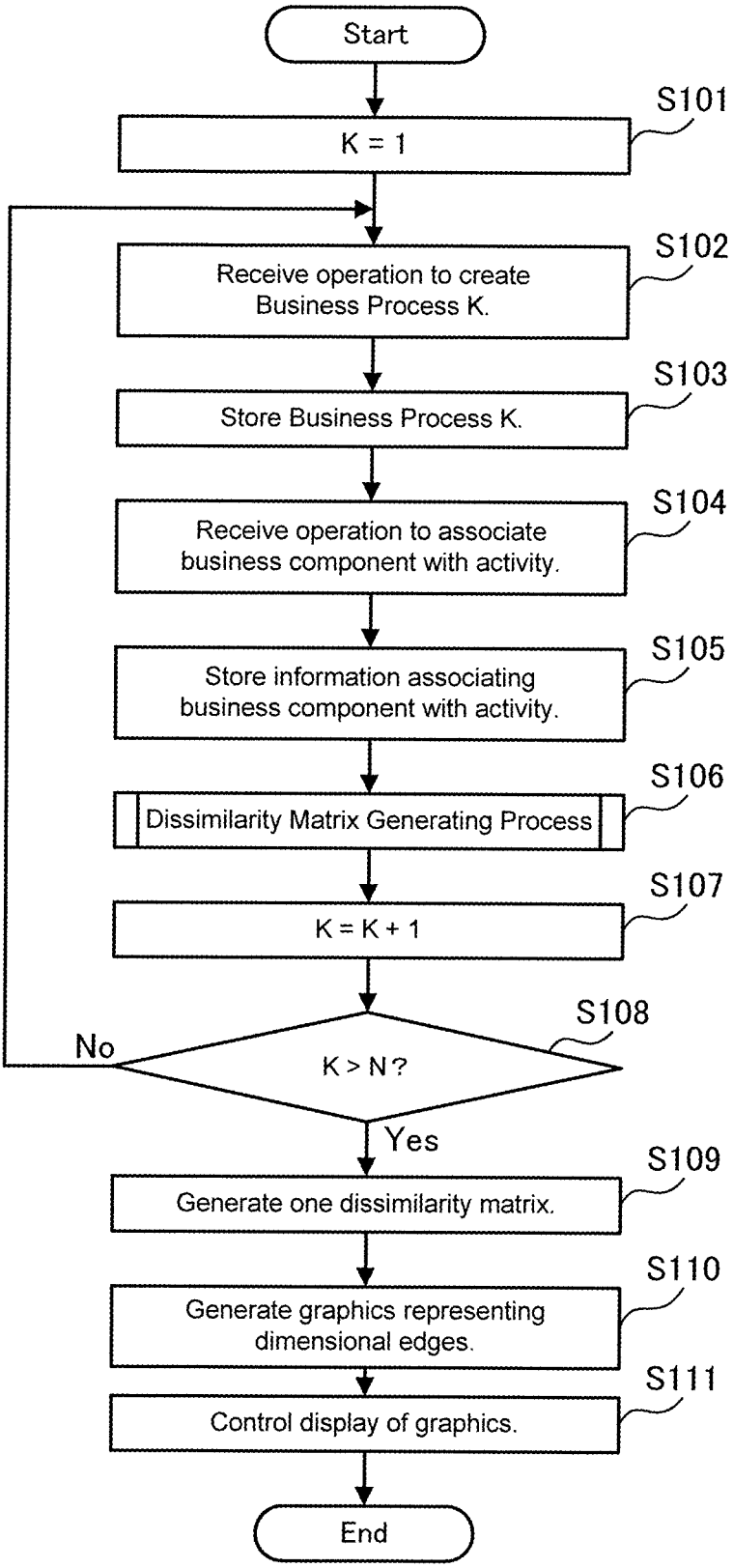
FIG. 8 is a flowchart showing an example of operations performed by a business modeling device, in accordance with embodiments of the present invention.

FIG. 8 is a flowchart showing an example of operations performed by the business modeling device 10, in accordance with embodiments of the present invention. In the following explanation, graphics data for two-dimensional edges and three-dimensional edges is displayed. First, the business modeling device 10 sets the constant K for counting the business processes to 1 (Step 101). When the user performs an operation to create a business process in the business modeling device 10 using the keyboard/mouse 10i (see FIG. 6), the operation receiving unit 11 receives the operation (Step 102). N business processes are identified in Step 102 by having been created, wherein N is at least one and may be at least 2 in some embodiments. The business process K (K=1, 2, . . . , N) is then stored in the business process storage unit $12_K$ (Step 103). As this time, each business process may include a plurality of activities, and each activity is associated with another activity via a line of association. Each business process comprises a sequence of activities to be executed in a specified sequential order. Each activity in the sequence is assigned a unique sequence number monotonically increasing with increasing sequential position in the sequential order with respect to the first activity in the sequence to be executed.

Next, when the user performs an operation to identify a business component corresponding to the activity with each activity defined in Step 102 and Step 103, the operation receiving unit 11 receives the operation (Step 104). Each activity in the sequence is associated, in Step 104, with a single business component of a plurality of business components of the business. Then, the correspondence information indicating the correspondence between the activities and the business components is stored in the correspondence information storage unit $13_K$ (Step 105). Because the business modeling device 10 has the ability to create CBM, associations may be made between activities and business components by expanding this ability.

Next, the dissimilarity matrix generating units $14_K$ perform the dissimilarity matrix generating process based on the business processes stored in business process storage units $12_K$ and the correspondence information stored in the correspondence information storage units $13_K$ (Step 106). The dissimilarity matrix generating process for Step S106 is described in FIG. 10. Afterwards, the business modeling device 10 adds 1 to the variable K (Step 107), and determines whether or not the value of the variable K has exceeded N (Step 108). If the value of variable K has not exceeded N, the process returns to Step 102. If the value of variable K exceeds N, N dissimilarity matrices have been generated, and one of these is stored in each dissimilarity matrix storage unit $15_1, 15_2, \ldots, 15_N$. If N is at least 2, then the dissimilarity matrix counting unit 16 counts the mean values of each element in the N dissimilarity matrices to generate a single dissimilarity matrix whose elements are a mean of corresponding elements of the N dissimilarity matrices, and this is stored in the dissimilarity matrix storage unit 17 (Step 109). If N=1, then Step 109 copies the dissimilarity matrix stored in dissimilarity matrix storage unit $15_1$ to the dissimilarity matrix storage unit 17.

When the single dissimilarity matrix has been stored in the dissimilarity matrix storage unit 17, the graphics generating unit 21 uses MDS to generate graphics for the two-dimensional edges and three-dimensional edges, and these are stored in the graphics storage unit 22 (Step 110). Then, the display control unit 25 performs controls to display the graphics stored in the graphics storage unit 22 (Step 111).

In this way, the user can view graphics of the two-dimensional edges and three-dimensional edges created by the business modeling device 10. The displayed graphics can be freely rotated by the user. Also, the user can confirm that there are N dissimilarity matrices calculated from N business processes. The user can also edit the N dissimilarity matrices. For example, the measure of dissimilarity between business component A and business component B can be freely edited. This means the user can independently weight the measures of dissimilarity between business components. Here, the graphics generating unit 21 calculates new edges based on the dissimilarity matrices edited by the user, and the display control unit 25 displays the graphics of the new edges for the user to view.

Figure 9:
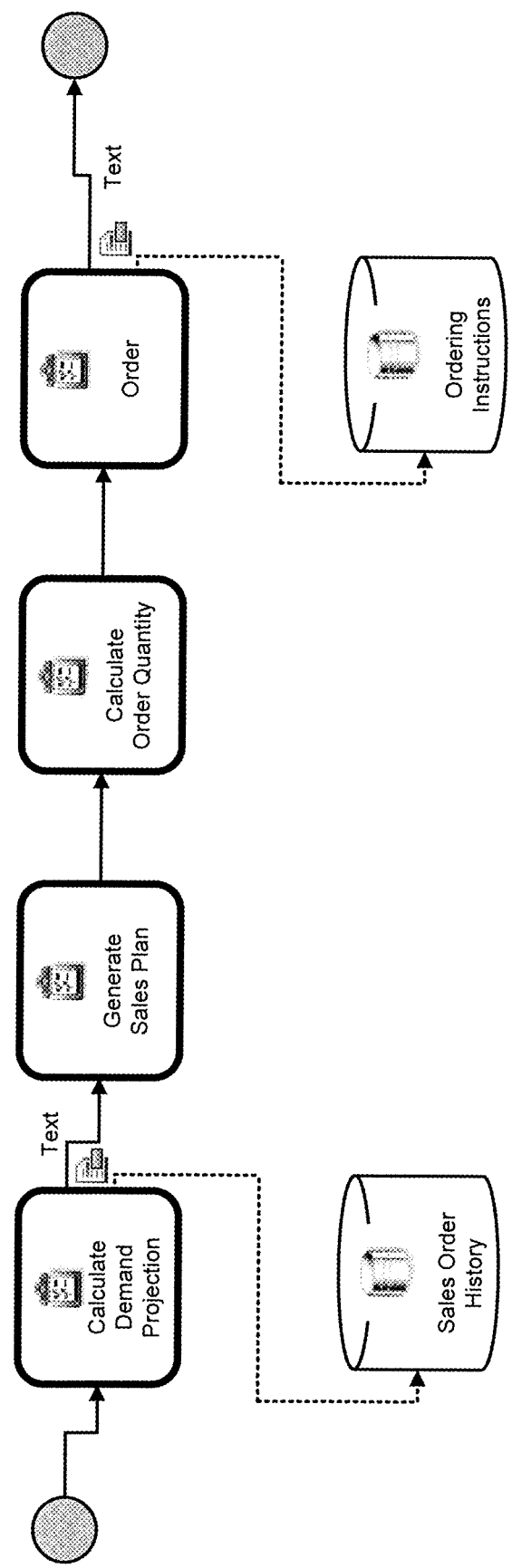
FIG. 9 is a diagram showing an example of a business process stored in the business process storage unit, in accordance with embodiments of the present invention.

The following is an explanation of the dissimilarity matrix generating principles in Step 106. FIG. 9 is a diagram showing an example of a business process stored in the business process storage units $12_K$, in accordance with embodiments of the present invention. In this drawing, activities are represented by squares surrounded by thick lines, and each activity is associated via a line of association indicated by an arrow. By defining the lines of association between activities, the order of execution for the activities is defined. The dissimilarity matrix generating unit $14_K$ interprets the order of execution for the activities from the business processes defined by the user, and the measures of dissimilarity between business components are established based on this. For example, in the drawing, the activity 'calculated demand projection' and the activity "create sales plan' are adjacent to each other, the measure of dissimilarity between the business components corresponding to these activities is smaller. Conversely, the activity 'calculate demand projection' and the activity 'place order' are located at both ends of the business process. Therefore, the measure of dissimilarity between the business components corresponding to these activities is larger. In this way, the dissimilarity matrix generating unit $14_K$ is able to create a single dissimilarity matrix from a single business process.

Figure 10:
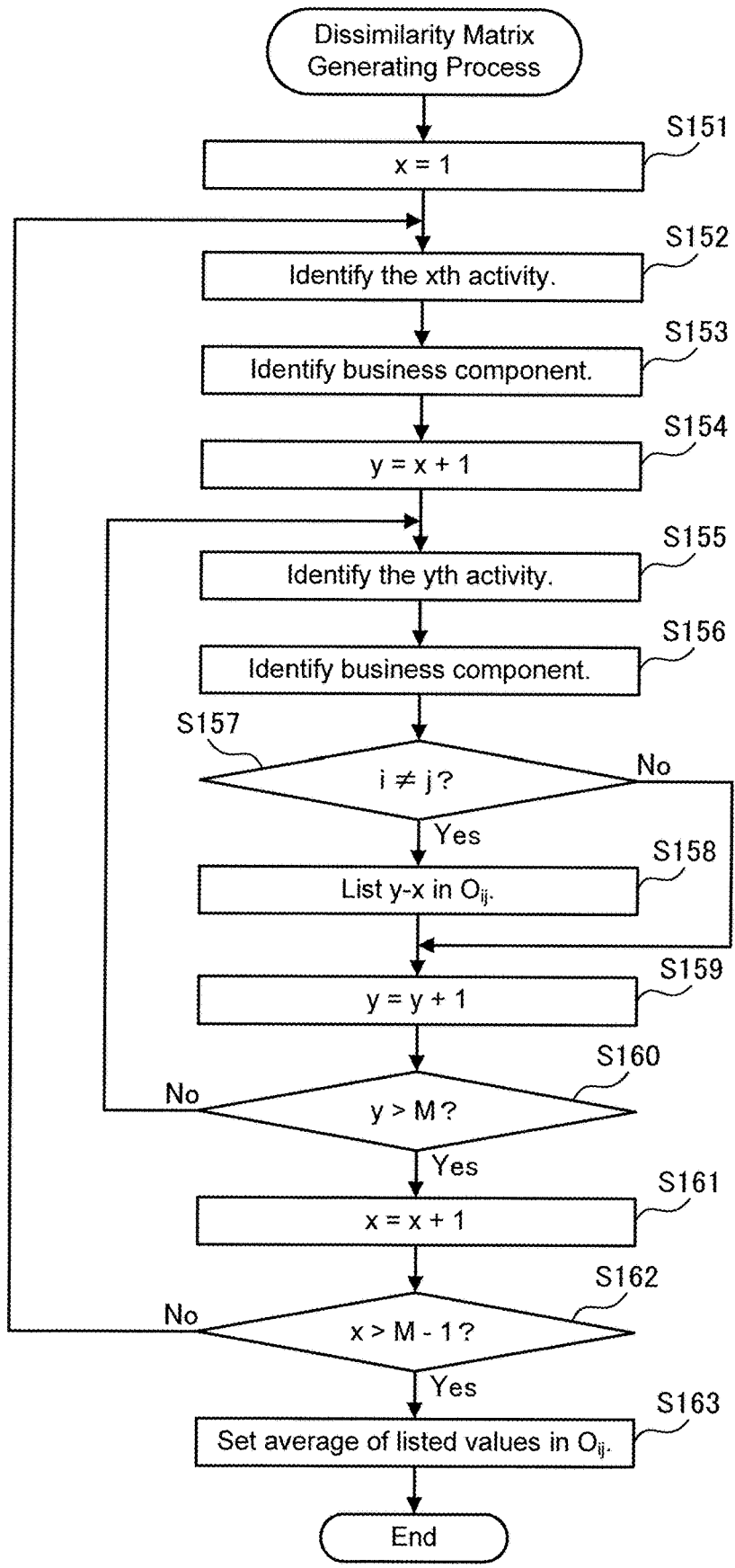
FIG. 10 is a flowchart showing an example of processing performed in a dissimilarity matrix generating process by a business modeling device, in accordance with embodiments of the present invention.

FIG. 10 is a flowchart showing an example of actions performed by a dissimilarity matrix generating unit $14_K$ (K=1, 2, . . . N) to generate a dissimilarity matrix for any one business process of the N business processes, in accordance with embodiments of the present invention. In the following explanation, the business process stored in the business process storage unit $12_K$ has M activities. Prior to these actions, the element i=j among the elements Oij in the dissimilarity matrix is set to 0.

First, the dissimilarity matrix generating unit $14_K$ sets to 1 the variable x for counting one activity (x) of two activities (x and y) whose measure of dissimilarity is to be determined (Step 151). Next, the dissimilarity matrix generating unit $14_K$ identifies activity x by referencing the business process stored in the business process storage unit $12_K$ (Step 152). Then, the business component associated with activity x is identified by referencing the correspondence information stored in the correspondence information storage unit 13 (Step 153). The business component identified here is the ith business component among all of the business components, so this business component is referred to as business component i below.

Also, the dissimilarity matrix generating unit $14_K$ sets to x+1 the variable y for counting the other activity (y) of two activities (x and y) whose measure of dissimilarity is to be determined (Step 154). Next, the dissimilarity matrix generating unit $14_K$ identifies activity y by referencing the business process stored in the business process storage unit $12_K$ (Step 155). Then, the business component associated with activity y is identified by referencing the correspondence information stored in the correspondence information storage unit 13 (Step 156). The business component identified here is the jth business component among all of the business components, so this business component is referred to as business component j below.

Next, the dissimilarity matrix generating unit $14_K$ determines whether or not i and j are equal (Step 157). If i and j are not equal, the dissimilarity matrix generating unit $14_K$ lists (y−x) as the measure of dissimilarity Oij between business component i and business component j (Step 158). When the same business component has been associated with a plurality of activities in a single business process, a plurality of measures of dissimilarity are determined for this business process. At this time, the mean value of the plurality of dissimilarity measures is used. Therefore, in Step 158, (y−x) is not entered as the measure of dissimilarity Oij. Instead, the values used to calculate the value to be entered as the measure of dissimilarity Oij are listed. If i and j are equal, 0 is entered as the measure of dissimilarity Oij and the process of listing (y−x) is not performed.

Afterwards, the dissimilarity matrix generating unit $14_K$ adds 1 to variable y (Step 159), and determines whether or not the value of variable y exceeds M (Step 160). If the value of variable y does not exceed M, the process returns to Step 155. If the value of variable y exceeds M, 1 is added to variable x (Step 161), and it is determined whether or not the value of variable x exceeds M−1 (Step 162). If the value of variable x does not exceed M−1, the process returns to Step 152. If the value of variable x exceeds M−1, the dissimilarity matrix generating unit $14_K$ computes the mean of the values listed as measure of dissimilarity Oij, and the mean value is entered as the measure of dissimilarity in matrix element Oij (Step 163).

The dissimilarity matrix generated by the process of FIG. 10 is a two-dimensional symmetric matrix in which the rows and columns of the dissimilarity matrix denote the business components of the business, wherein the diagonal elements of the dissimilarity matrix are zero, and wherein the off diagonal elements of the dissimilarity matrix are the dissimilarity measures for the matrix element Oij determined in Step S158. Each off-diagonal element Oij of the matrix is specific to two different business components and (i) comprises an only dissimilarity measure determined in Step S158 for the two different business components, (ii) comprises a mean of a plurality of dissimilarity measures determined in Step S158 for the two different business components, or (iii) is blank which denotes that no dissimilarity measure has been determined in Step S158 for the two different business components.

In this business modeling device 10, N business processes are defined. However, a single business process may also be defined. Even though N business processes are defined, it may be treated as a single business process for the sake of convenience. Here, business process storage units $12_1$, $12_2$, . . . , $12_N$ are treated as business process storage unit 12, correspondence information storage units $13_1$, $13_2$, . . . , $13_N$ are treated as correspondence information storage unit 13, dissimilarity matrix generating units $14_1$, $14_2$, . . . , $14_N$ are treated as dissimilarity matrix generating unit 14, and dissimilarity matrix storage units $15_1$, $15_2$, . . . , $15_N$ are treated as dissimilarity matrix storage unit 15. Thus, the respective dissimilarity matrices of the N business processes may be stored in dissimilarity matrix storage units $15_1$, $15_2$, . . . , $15_N$ or in a single dissimilarity matrix storage unit 15. Also, a dissimilarity matrix counting unit 16 and a dissimilarity matrix storage unit 17 are not provided. In addition, the graphics generating unit 21 and numerical solution calculating unit 23 may generate graphics data and a numerical solution by directly referencing the dissimilarity matrix storage unit 15.

The following is an explanation of the actions of the present embodiment using a specific example. FIG. 11 is a diagram showing an example of a virtual CBM. In this drawing, 'business competency' is shortened to 'competency', in accordance with embodiments of the present invention. Also, BC is an abbreviation of 'business component'.

FIG. 12 is a diagram showing an example of an order of execution for business components based on a virtual business process, in accordance with embodiments of the present invention. The order of execution for the business components corresponds to the linkage of business components identified in Step 153 and Step 156 in FIG. 10 in numerical order. In the drawing, the business process number used to identify the business process is referred to simply as the 'number'. As shown in the drawing, the business process numbers range from 1 to 8, but N in FIG. 7 and FIG. 8 is 8 in this example. In the following, a business process whose business process number is K is referred to as 'business process K'.

As explained above, the measure of dissimilarity between business components is defined based on the order of execution between the business components in the business process. FIG. 13 is a diagram showing a dissimilarity matrix obtained from business process 2 among the virtual business processes, in accordance with embodiments of the present invention. The dissimilarity matrix corresponds to the dissimilarity matrix generated by the dissimilarity matrix generating process in Step 106 when K=2 in FIG. 8. In business process 2, the measure of dissimilarity between adjacent business components, that is, the measure of dissimilarity $O_{26}$ between BC2 and BC6, and the measure of dissimilarity $O_{68}$ between BC6 and BC8 is one. The measure of dissimilarity $O_{28}$ between BC2 and BC8, which are separated from each other by two, is two. In this example, the dissimilarity matrix is assumed to be symmetrical. In other words, Oij=Oji.

A dissimilarity matrix is calculated from all of the business processes in the following manner. Here, the mean is used if a plurality of values is obtained for the measure of dissimilarity Oij. For example, in business process 2, two values, 1 and 2, are obtained for the measure of dissimilarity $O_{27}$ between BC2 and BC7, and the mean value for the measure of dissimilarity $O_{27}$ is 1.5. In business process 6, four values, 1, 4, 1 and 2, are obtained for the measure of dissimilarity $O_{57}$ between BC5 and BC7, and the mean value for the measure of dissimilarity $O_{57}$ is 2. In Step 158, the values for (y–x) are listed in Step 158, and the mean (e.g., arithmetic mean) of the listed values is set as the measure of dissimilarity Oij in Step 163.

FIG. 14 is a diagram showing a dissimilarity matrix obtained by all of the virtual business processes, in accordance with embodiments of the present invention. This dissimilarity matrix corresponds to the dissimilarity matrix generated in Step 109 of FIG. 8. However, this dissimilarity matrix includes missing values as indicated by the blank spaces. For example, the measure of dissimilarity $O_{12}$ between BC1 and BC2 is a missing value, which means there is no business process including both BC1 and BC2. Also, in this example, some missing values are allowed, but partially missing values are not allowed in which there is a missing value for the row or a missing value for the column. Because the business components in the CBM represent functions that are essential to the conducting of business, the existence of these partially missing values indicates that a function of the component does not appear in the business process and is considered unnatural. Conversely, when a business component is present in the CBM but not allowed to appear in the business process, missing values occur in either the row or column units of the dissimilarity matrix. There are six missing values in the dissimilarity matrix of FIG. 14, but the overall total does not exceed 7.4%. Therefore, edges can be expected which are substantially similar those obtained from a dissimilarity matrix without any missing values.

FIG. 15 through FIG. 17 are diagrams showing the analysis results obtained from the dissimilarity matrix in FIG. 14, in accordance with embodiments of the present invention. The analysis results correspond to analysis results obtained while generating the graphics in Step 110 of FIG. 8. FIG. 15 is a diagram showing the stresses and determination coefficients (RSQ) when two-dimensional edges, three-dimensional edges and four-dimensional edges are selected. Here, stress refers to the degree of nonconformity S obtained in Equation 2 described above. The determination coefficient, sometimes referred to as a contribution ratio, is the square of the correlation coefficient between the dissimilarity measure (variable X) and the distance between two points obtained from an edge (variable Y). When three types of edge are obtained, two-dimensional edges, three-dimensional edges, and four-dimensional edges, determination coefficients can be used instead of stresses as the criterion for selecting an edge (i.e., for determining the points in the space of p dimensions). Here, determination coefficients are also shown. In the case of stress, a lower value means a greater degree of conformity. More specifically, because the determination coefficient is a square of the correlation coefficient as mentioned above, a value closer to one means a greater degree of conformity.

FIG. 16 is a diagram showing the distances between points in three-dimensional edges and four-dimensional edges, in accordance with embodiments of the present invention. When the dissimilarity matrix in FIG. 14 is analyzed as input, the maximum renderable dimension is four dimensions because of the relationship between the number of measures of dissimilarity to be observed and number of parameters to be estimated. From the obtained analysis results, four-dimensional edges have the smallest stress values, but edges in four-dimensional space cannot be represented visually. However, because, as shown in FIG. 16, the magnitude relationship of the distance between each business component does not change very much in three-dimensional edges and four-dimensional edges, no problems occur when the positional relationship between business components is considered on the basis of three-dimensional edges.

Figure 18:
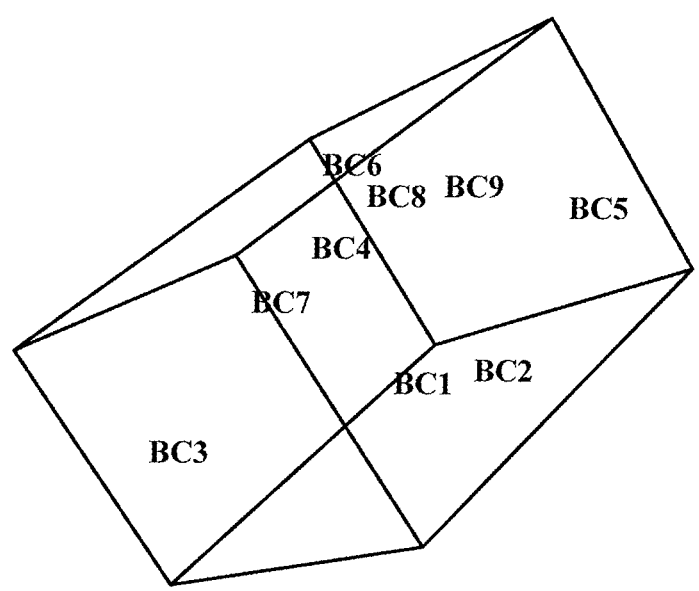
FIG. 18 is a diagram showing a graphic depiction of three-dimensional edges, in accordance with embodiments of the present invention.

Then, coordinates in three-dimensional space are determined for each business component to select three-dimensional edges. FIG. 17 is a diagram showing the coordinates of three-dimensional edges, in accordance with embodiments of the present invention. Each stimulus number in FIG. 17 denotes a unique business component whose spatial coordinates denote a point in three dimensions. Generally, application of MDS to the single dissimilarity matrix generated in step S109 of FIG. 8 generates a point n p dimensions for each business component: (i) minimizing the stress pertaining to distances between the points in p dimensions, as described supra; or (ii) maximizing the determination coefficient which is the square of a correlation coefficient between the dissimilarity measures in the single dissimilarity matrix and distances between the points in p dimensions, as described supra. In one embodiment, p is 2, 3, or 4. Finally, graphics are generated for three-dimensional edges based on these analysis results. The graphics for three-dimensional edges correspond to the graphics generated by Step 110 in FIG. 8. FIG. 18 is a diagram showing a graphic depiction of three-dimensional edges, in accordance with embodiments of the present invention. When three-dimensional edges are viewed from various angles, aspects of the configuration of the business components can be confirmed, for example, how close BC1 and BC2 are and how close BC6 and BC8 are to each other. Other aspects of the configuration of the business components can also be confirmed, for example, how far apart BC3 is from BC4, BC5 and BC9, how far apart BC4 is from BC5 and BC8, and how far apart BC2 is from BC6. These results faithfully reflect the dissimilarity matrix of inputted data in FIG. 14.

A diagram obtained using MDS provides information that is clearly different from CBM, which represents the information in the form of a two-dimensional matrix. For example, the three-dimensional edges can be used as input information when studying how to implement cooperation between systems. BC1 and BC2, and BC6 and BC8, are arranged close to each other, which suggests the possibility a direct exchange of data between these business components. If the amount of data is small, the data can be exchanged using SOA. When the amount of data is large, a data exchange method such as file sharing may have to be considered given the load on the enterprise service bus (ESB). Also, information sharing may occur frequently between business components arranged close to each other. Therefore, in some cases, ownership of information may have to be clarified in the decision-making process, such as by constructing infrastructure that exclusively identifies shared information. Alternatively, a topic of discussion may arise early as to whether these business components should be divided from each other in the system.

Also, BC1 and BC8 are located in the center of the three-dimensional configuration, which suggests the possibility that these business components play a central or shared role in the business. This may promote a discussion as to whether the CBM configuration should identify hot components in the same way as MDS. Conversely, BC2, BC3, BC4, BC6 and BC7 are arranged at some distance from other business components. This may suggest that these are not core competencies, and should be candidates for outsourcing. These are examples of new considerations raised by CBM.

MDS releases business components from the spell of management hierarchy and business competencies, and arranges business components in N-dimensional space by creating new linkages known as measures of dissimilarity. Visualization of associations between business components using MDS may suggest a new perspective for consultants and architects which is not obtained from CBM.

In the present embodiment, there is usually only one measure of dissimilarity between adjacent business components. However, the weighting of measures of dissimilarity may be changed depending on the frequency of execution in the business process or the amount of data processed in the business process. For example, if the business process stored in business process storage unit $12_1$ is executed twice as frequently as the business processes stored in the other business process storage units $12_2, 12_3, \ldots 12_N$, the measure of dissimilarity used by dissimilarity matrix $14_1$ may be doubled relative to the measures of dissimilarity used by dissimilarity matrix generating units $14_2, 14_3, \ldots, 14_N$. Here, the weightings of the frequency of execution for the business processes stored in business process storage units $12_1, 12_2, \ldots 12_N$ is nothing more than the weighted average of the measures of dissimilarity calculated by the dissimilarity matrix generating units $14_1, 14_2, \ldots, 14_N$. A similar decision may be made to take into account the amount of data processed by each business process.

Although it is assumed that symmetry holds for the dissimilarity measures in the present embodiment, an asymmetrical dissimilarity matrix can be obtained by, for example, distinguishing between BC1→BC2 and BC2→BC1 as $O_{12}$ and $O_{21}$. This allows for more precise differentiation in the order of execution for BC1 and BC2, and may produce analysis results that are different from those provided here. When an asymmetrical dissimilarity matrix is represented visually, the distances between business components may appear symmetrical when plotted in two-dimensional or three-dimensional space. In this case, another means may be devised to express spatial distortion.

Here, the present invention can be realized using all hardware or all software. It can also be realized using a combination of both hardware and software. The present invention can also be realized as a computer, computer system, data processing system, or computer program. The computer program can be stored and distributed as program code on a computer-readable storage device. Here, the storage device can be electronic, magnetic, optical, mechanical, or a semiconductor system (hardware device or equipment). Examples of computer-readable storage devices include semiconductors, solid-state storage devices, magnetic tape, removable computer diskettes, random-access memory (RAM), read-only memory (ROM), rigid magnetic disks, and optical disks. Examples of optical disks at the present time include compact disk read-only memory (CD-ROM) disks, compact disk read/write (CD-R/W) disk, and DVDs. The term "computer-readable storage device" does not encompass signal propagation media such as copper cables, optical fibers and wireless transmission media.

When a computer program of the present invention is provided on a computer-readable storage device, a computer program for executing the process in FIG. 4 and the computer program for executing the process in FIG. 6 can be stored in the same storage device or in different storage devices.

A computer program product of the present invention comprises a computer readable storage device (e.g., magnetic disk device $10g$ or flexible disk drive $10j$ of FIG. 6) having a computer readable program code stored therein, said program code containing instructions which, upon being executed by a processor of a computer system CPU $10a$ of FIG. 6), implement the methods of the present convention.

A computer system of the present invention comprises a processor (e.g., CPU $10a$ of FIG. 6), a memory (e.g., main memory $10c$ of FIG. 6) coupled to the processor, and a computer readable storage device (e.g., magnetic disk device $10g$ or flexible disk drive $10j$ of FIG. 6) coupled to the processor, said storage device containing program code which, upon being executed by the processor via the memory, implements the methods of the present convention.

The present invention was explained above using an embodiment, but the technical scope of the present invention is not limited in any way by this embodiment. It should be clear a person of skill in the art that various modifications and substitutions can be made without departing from the spirit and scope of the present invention.

What is claimed is:

1. A method for utilizing dissimilarity among business components of a business, said method comprising:

for each business process of N business processes of the business, storing, by a processor of a computer system, N two-dimensional symmetric dissimilarity matrices in respective storage units of the computer system or in a single storage unit of the computer system, wherein N is at least 1, wherein if N=1, a single dissimilarity matrix is a copy of a two-dimensional symmetric dissimilarity matrix of the N two-dimensional symmetric dissimilarity matrices, and wherein if N is at least 2, the elements of the single dissimilarity matrix are a mean of corresponding elements of the N dissimilarity matrices, wherein a point in p dimensions for each business component resulted from application of multidimensional scaling (MDS) to the single dissimilarity matrix for multiple p values, wherein each p value is a positive integer, and wherein the multiple p values comprise 2 and 3, wherein for each p value of the multiple p values, p-dimensional edges resulted from a determination of a point in a space of p dimensions for each business component via said application of multidimensional scaling (MDS) to the single dissimilarity matrix;

said processor retrieving from a dissimilarity measure storage unit of the computer system, for each p value of multiple p values, a p-stress pertaining to the p-dimensional edges, wherein the p-stress is a measure of deviation between the distances between points in the space of p dimensions and respective elements in the dissimilarity matrix such that the points in the space of p dimensions minimize the p-stress;

said processor displaying, to a user on a display device, for each p value of the multiple p values, the p-stress and in response, said processor receiving a selection, by a user via an input device, of a dimension P from the multiple p values, wherein P is 2 or 3;

said processor displaying, to the user on the display device, a P-dimensional graph of the p-dimensional edges, wherein the P-dimensional graph depicts a rotatable spatial distribution of the business components of a plurality of business components, and wherein the rotatable spatial distribution provides visual assistance to the user for selecting, based on spatial distances between the displayed business components, one or more business components of the displayed business components; and said processor receiving a selection, by the user via the input device, of the one or more business components for utilizing the one or more business components in a manner that reflects the spatial distances between the displayed business components.

2. The method of claim 1, wherein each two-dimensional symmetric dissimilarity matrix comprises rows and columns, wherein the rows and columns denote the business components of the business, wherein each diagonal element of each symmetric dissimilarity matrix comprises zero, and wherein each off-diagonal element of each symmetric dissimilarity matrix is specific to a pair of two different business components and (I) comprises an only dissimilarity measure assigned to the pair of two different business components, (ii) comprises a mean of a plurality of dissimilarity measures assigned to the pair of two different business components, or (iii) is blank which denotes that no dissimilarity measure has been assigned to the pair of two different business components.

3. The method of claim 1, wherein said application of MDS to the single dissimilarity matrix minimizes a stress pertaining to distances between the points in p dimensions.

4. The method of claim 1, wherein said application of MDS to the single dissimilarity matrix maximizes a square of a correlation coefficient between the dissimilarity measures in the single dissimilarity matrix and distances between the points in p dimensions.

5. The method of claim 1, wherein for one business process of the N business processes, a plurality of dissimilarity measures has been assigned to at least one pair of two different business components.

6. The method of claim 1, wherein for one business process of the N business processes, no dissimilarity measure has been assigned to at least one pair of two different business components.

7. The method of claim 1, wherein the one or more business components consist of two or more business components positioned relatively close to each other in the P-dimensional graph, and wherein the method further comprises:

said processor implementing a direct exchange of data between the business components of the two or more business components.

8. The method of claim 1, wherein the one or more business components consist of a candidate business component positioned relatively distant from the other business components in the P-dimensional graph, and wherein the method further comprises:

outsourcing the candidate business component.

9. The method of claim 1, wherein each business process comprises a sequence of activities executed in a specified sequential order, wherein each activity in the sequence is assigned a unique sequence number monotonically increasing with increasing sequential position in the sequential order with respect to the first activity in the sequence, and wherein each activity in the sequence is associated with a single business component of a plurality of business components of the business.

10. A computer program product, comprising a computer readable hardware storage device having computer readable program code stored therein, said program code containing instructions which, upon being executed by a processor of a computer system, implement a method for utilizing dissimilarity among business components of a business, said method comprising:

for each business process of N business processes of the business, storing, by the processor, N two-dimensional symmetric dissimilarity matrices in respective storage units of the computer system or in a single storage unit of the computer system, wherein N is at least 1, wherein if N=1, a single dissimilarity matrix is a copy of a two-dimensional symmetric dissimilarity matrix of the N two-dimensional symmetric dissimilarity matrices, and wherein if N is at least 2, the elements of the single dissimilarity matrix are a mean of corresponding elements of the N dissimilarity matrices, wherein a point in p dimensions for each business component resulted from application of multidimensional scaling (MDS) to the single dissimilarity matrix for multiple p values, wherein each p value is a positive integer, and wherein the multiple p values comprise 2 and 3, wherein for each p value of the multiple p values, p-dimensional edges resulted from a determination of a point in a space of p dimensions for each business component via said application of multidimensional scaling (MDS) to the single dissimilarity matrix;

said processor retrieving from a dissimilarity measure storage unit of the computer system, for each p value of multiple p values, a p-stress pertaining to the p-dimensional edges, wherein the p-stress is a measure of deviation between the distances between points in the space of p dimensions and respective elements in the dissimilarity matrix such that the points in the space of p dimensions minimize the p-stress;

said processor displaying, to a user on a display device, for each p value of the multiple p values, the p-stress and in response, said processor receiving a selection, by a user via an input device, of a dimension P from the multiple p values, wherein P is 2 or 3;

said processor displaying, to the user on the display device, a P-dimensional graph of the p-dimensional edges, wherein the P-dimensional graph depicts a rotatable spatial distribution of the business components of a plurality of business components, and wherein the rotatable spatial distribution provides visual assistance to the user for selecting, based on spatial distances between the displayed business components, one or more business components of the displayed business components; and said processor receiving a selection, by the user via the input device, of the one or more business components for utilizing the one or more business components in a manner that reflects the spatial distances between the displayed business components.

11. The computer program product of claim 10, wherein each two-dimensional symmetric dissimilarity matrix comprises rows and columns, wherein the rows and columns denote the business components of the business, wherein each diagonal element of each symmetric dissimilarity matrix comprises zero, and wherein each off-diagonal element of each symmetric dissimilarity matrix is specific to a pair of two different business components and (I) comprises an only dissimilarity measure assigned to the pair of two different business components, (ii) comprises a mean of a plurality of dissimilarity measures assigned to the pair of two different business components, or (iii) is blank which denotes that no dissimilarity measure has been assigned to the pair of two different business components.

12. The computer program product of claim 10, wherein said application of MDS to the single dissimilarity matrix minimizes a stress pertaining to distances between the points in p dimensions.

13. The computer program product of claim 10, wherein said application of MDS to the single dissimilarity matrix maximizes a square of a correlation coefficient between the dissimilarity measures in the single dissimilarity matrix and distances between the points in p dimensions.

14. The computer program product of claim 10, wherein for one business process of the N business processes, a plurality of dissimilarity measures has been assigned to at least one pair of two different business components.

15. A computer system comprising a processor, a memory coupled to the processor, and a computer readable storage device coupled to the processor, said storage device containing program code which, upon being executed by the processor via the memory, implements a method for utilizing dissimilarity among business components of a business, said method comprising:

for each business process of N business processes of the business, storing, by the processor, N two-dimensional symmetric dissimilarity matrices in respective storage units of the computer system or in a single storage unit of the computer system, wherein N is at least 1, wherein if N=1, a single dissimilarity matrix is a copy of a two-dimensional symmetric dissimilarity matrix of the N two-dimensional symmetric dissimilarity matrices, and wherein if N is at least 2, the elements of the single dissimilarity matrix are a mean of corresponding elements of the N dissimilarity matrices, wherein a point in p dimensions for each business component resulted from application of multidimensional scaling (MDS) to the single dissimilarity matrix for multiple p values, wherein each p value is a positive integer, and wherein the multiple p values comprise 2 and 3, wherein for each p value of the multiple p values, p-dimensional edges resulted from a determination of a point in a space of p dimensions for each business component via said application of multidimensional scaling (MDS) to the single dissimilarity matrix;

said processor retrieving from a dissimilarity measure storage unit of the computer system, for each p value of multiple p values, a p-stress pertaining to the p-dimensional edges, wherein the p-stress is a measure of deviation between the distances between points in the space of p dimensions and respective elements in the dissimilarity matrix such that the points in the space of p dimensions minimize the p-stress;

said processor displaying, to a user on a display device, for each p value of the multiple p values, the p-stress and in response, said processor receiving a selection, by a user via an input device, of a dimension P from the multiple p values, wherein P is 2 or 3;

said processor displaying, to the user on the display device, a P-dimensional graph of the p-dimensional edges, wherein the P-dimensional graph depicts a rotatable spatial distribution of the business components of a plurality of business components, and wherein the rotatable spatial distribution provides visual assistance to the user for selecting, based on spatial distances between the displayed business components, one or more business components of the displayed business components; and said processor receiving a selection, by the user via the input device, of the one or more business components for utilizing the one or more business components in a manner that reflects the spatial distances between the displayed business components.

16. The computer system of claim 15, wherein each two-dimensional symmetric dissimilarity matrix comprises rows and columns, wherein the rows and columns denote the business components of the business, wherein each diagonal element of each symmetric dissimilarity matrix comprises zero, and wherein each off-diagonal element of each symmetric dissimilarity matrix is specific to a pair of two different business components and (I) comprises an only dissimilarity measure assigned to the pair of two different business components, (ii) comprises a mean of a plurality of dissimilarity measures assigned to the pair of two different business components, or (iii) is blank which denotes that no dissimilarity measure has been assigned to the pair of two different business components.

17. The computer system of claim 15, wherein said application of MDS to the single dissimilarity matrix minimizes a stress pertaining to distances between the points in p dimensions.

18. The computer system of claim 15, wherein said application of MDS to the single dissimilarity matrix maximizes a square of a correlation coefficient between the dissimilarity measures in the single dissimilarity matrix and distances between the points in p dimensions.

19. The computer system of claim 15, wherein for one business process of the N business processes, a plurality of dissimilarity measures has been assigned to at least one pair of two different business components.

* * * * *